(12) United States Patent
Chang et al.

(10) Patent No.: US 7,507,380 B2
(45) Date of Patent: Mar. 24, 2009

(54) MICROCHEMICAL NANOFACTORIES

(75) Inventors: Chih-Hung Chang, Corvallis, OR (US);
Brian Kevin Paul, Corvallis, OR (US);
Vincent Thomas Remcho, Corvallis, OR (US)

(73) Assignee: State of Oregon Acting By and Through the State Board of Higher Education on behalf of Oregon State University, Corvallis, OR (US)

( * ) Notice: Subject to any disclaimer, the term of this patent is extended or adjusted under 35 U.S.C. 154(b) by 497 days.

(21) Appl. No.: 11/086,074

(22) Filed: Mar. 21, 2005

(65) Prior Publication Data

US 2005/0220681 A1    Oct. 6, 2005

Related U.S. Application Data

(60) Provisional application No. 60/554,901, filed on Mar. 19, 2004, provisional application No. 60/554,997, filed on Mar. 19, 2004.

(51) Int. Cl.
*B01J 8/00* (2006.01)
*B01J 10/00* (2006.01)
*B32B 3/20* (2006.01)
*B32B 3/12* (2006.01)

(52) U.S. Cl. .............. 422/129; 422/198; 422/130; 422/139; 422/141; 422/142; 422/145; 422/146; 428/188; 428/166; 428/172; 428/178

(58) Field of Classification Search .............. 422/198, 422/129, 130, 131, 139, 141, 142, 145, 146; 428/188, 166, 172, 178
See application file for complete search history.

(56) References Cited

U.S. PATENT DOCUMENTS

| 4,100,068 | A | * | 7/1978 | Jordan et al. | ............. 209/127.1 |
| 5,534,328 | A | * | 7/1996 | Ashmead et al. | ............ 428/166 |
| 5,974,867 | A | * | 11/1999 | Forster et al. | ............. 73/61.41 |
| 6,143,247 | A | * | 11/2000 | Sheppard et al. | ............. 422/63 |
| 6,225,497 | B1 | * | 5/2001 | Becker et al. | ............... 560/347 |
| 6,329,139 | B1 | * | 12/2001 | Nova et al. | .................... 506/30 |

(Continued)

OTHER PUBLICATIONS

U.S. Appl. No. 10/803,502, filed Mar. 17, 2004, Paul et al.

(Continued)

*Primary Examiner*—Walter D Griffin
*Assistant Examiner*—Huy-Tram Nguyen
(74) *Attorney, Agent, or Firm*—Klarquist Sparkman LLP

(57) ABSTRACT

Embodiments of an apparatus, system, and method for chemical synthesis and/or analysis are disclosed. One embodiment of a disclosed apparatus comprises a laminated, microfluidic structure defining a reactor and a separator. Such apparatuses, or portions thereof, generally have dimensions ranging from about 1 micrometer to about 100 micrometers. To implement synthetic processes, disclosed embodiments of the apparatus generally include at least one valve, and often plural, selectively actuatable valves. Detectors, including optical detectors, also can be used to detect product and other materials as they flow by, or are otherwise presented to, the detector. Individual apparatuses may be coupled both in series and in parallel to form a system for making chemical compounds. The apparatus is particularly useful for making compounds requiring iterative reaction schemes, and further can be used to make compounds having morphological structures that resemble the morphology of the apparatus itself, such as dendrimers.

43 Claims, 25 Drawing Sheets

U.S. PATENT DOCUMENTS

| | | | |
|---|---|---|---|
| 6,537,506 B1* | 3/2003 | Schwalbe et al. | 422/130 |
| 6,652,627 B1* | 11/2003 | Tonkovich et al. | 95/104 |
| 6,672,502 B1 | 1/2004 | Paul et al. | |
| 6,676,835 B2* | 1/2004 | O'Connor et al. | 210/542 |
| 6,688,381 B2 | 2/2004 | Pence et al. | |
| 6,737,026 B1* | 5/2004 | Bergh et al. | 422/130 |
| 6,744,038 B2* | 6/2004 | Wang et al. | 250/251 |
| 6,793,831 B1 | 9/2004 | Paul et al. | |
| 6,903,332 B2* | 6/2005 | Weiss et al. | 250/287 |
| 7,118,920 B2* | 10/2006 | Brophy et al. | 436/183 |
| 2002/0045265 A1* | 4/2002 | Bergh et al. | 436/37 |
| 2002/0108859 A1* | 8/2002 | Wang et al. | 204/547 |
| 2003/0168590 A1* | 9/2003 | Weiss et al. | 250/286 |
| 2004/0022691 A1* | 2/2004 | Allen et al. | 422/102 |
| 2004/0208751 A1* | 10/2004 | Lazar et al. | 417/48 |
| 2005/0074834 A1 | 4/2005 | Chaplen et al. | |
| 2005/0126211 A1 | 6/2005 | Drost et al. | |
| 2005/0129580 A1* | 6/2005 | Swinehart et al. | 422/100 |

OTHER PUBLICATIONS

Allis and Spencer, "16: Nanostructural Architectures from Molecular Building Blocks," *Handbook of Nanoscience, Engineering, and Technology*, pp. 16-1-16-32, 2003.

Schwab, Levin and Michl, "Molecular Rods. 1. Simple Axial Rods," *Chemical Reviews*, vol. 99, No. 7, pp. 1863-1933, 1999.

Tour, "Chapter 3: Chemical Synthesis," *Molecular Electronics, Commerical Insights, Chemistry, Devices, Architecture and Programming*, World Scientific, pp. 33-41, Mar. 2003.

\* cited by examiner

Top View

X-section down center of channel

(100 μM)

(200 μM)

(400 μM)

Exitation Signal

Emission Signal

Microfluidic

MICROCHEMICAL NANOFACTORIES

CROSS REFERENCE TO RELATED APPLICATIONS

This application claims the benefit of the earlier filing date of U.S. provisional patent applications, Nos. 60/554,901 and 60/554,997, entitled "Microchemical Microfactories," both of which were filed on Mar. 19, 2004, and are incorporated herein by reference in their entirety.

FIELD

The present disclosure concerns embodiments of microchemical nanofactories, methods for their use, and compounds and compositions made using disclosed embodiments of the microchemical nanofactories.

BACKGROUND

The production of specialty chemicals, such as polymeric and pharmaceutical materials, is an important aspect of the global economy. Many such chemicals are responsible for an improved life style. However, the production of specialty chemicals is time consuming and often inefficient.

Dendrimers are an example of a specialty chemical that can be produced by typical synthetic methodology. Dendrimers are nanoscale macromolecules that have highly branched and core-shell structures with hollow internal voids and a number of peripheral functionalities. They are synthesized stepwise manner to form higher generations using a plethora of chemical reactions. The chemistry of the core and the terminal functionalities can be tailored according to the specific application.

Dendrimers have tremendous potential, but the conventional synthetic approach is time-consuming. Since the first dendrimer synthesis in the late 1980's [D. A. Tomalia, H. Baker, J. Dewald, M. Hall, G. Kallos, S. Martin, J. Roeck, J. Ryder and P. Smith, *Polym. J. (Tokyo)*, 17, 117 (1985)] dendrimers have found many applications, including catalysis [C. Bohm, N. Derrien, A. Seger, *Synlett*, 387(1996)]; sensors, [M. Wells, R. M. Crooks, *J. Am. Chem. Soc.*, 16, 3988(1996)]; and drug delivery and light harvesting [M. Freemantle, *C&EN*, 77, 27 (1999)]. Higher generation dendrimers have close packed, peripheral functional groups and a hollow interior. This unique feature provides a high capacity to act as hosts to encapsulate guests in the interior and conjugate molecules on the surface. Their nanometer size allows them to easily penetrate into cells. Along with targeting tumor and other cells as drug delivery systems, dendrimers have shown promising results as tools for MRI imaging and gene transfer techniques. Also, dendrimer-based nanocomposites are being studied as possible antimicrobial agents to fight *Staphylococcus aureus, Pseudomonas aeruginosa*, and *Escherichia coli*. L. Balogh, A. Bielinska, J. D. Eichman, R. Valluzi, and others. Dendrimer Nanocomposites in Medicine. The University of Michigan Center for Biologic Nanotechnology, Tuff Biotechnology Center and Department of Radiation Oncology at The University of Michigan. Dendrimers have been shown to act as scavengers of metal ions, offering the potential for use in environmental clean-up applications. Their size allows them to be filtered out post-extraction using common ultrafiltration techniques. Recently, Le Berre et al. [Le Berre, Nucleic Acids Res. 2003, 31 (16) 88] described attaching dendrimeric coating to glass slides for sensitive DNA microarray analysis. Again acting as scavengers, dendrimers have been employed for rapid purification in solution-phase, parallel synthesis. L. Williams and S. M. Neset, Fourth International Electronic Conference on Synthetic Organic Chemistry (ECSOC-4), Sep. 1-30, 2000, Paper No. B0011.

Dendrimers can be synthesized with great precision. Ideally a certain generation of dendrimer has a single size and molecular weight rather than a broad molecular weight distribution like linear polymers. Kim, R. M.; Manna, M.; Hutchins, S. M.; Griffin, P. R.; Yates, N. A.; Bernick, A. M.; Chapman, K. T. *Proc. Natl. Acad. Sci. USA* 1996, 93, 10012-10017. But, in many cases, the limiting factor on the application of dendrimers is their production cost. Two general approaches to dendrimer synthesis exist. The divergent approach, arising from the seminal work of Tomalia and Newkome, initiates growth at the core of the dendrimer and continues outward by the repetition of coupling and activation steps. Convergent synthesis, first reported by Hawker and Fréchet in 1989 [J. M. J. Fréchet, Y. Jiang, C. J. Hawker, A. E. Philippides, *Proc. IUPAC Int. Symp.*, Macromol. (Seoul), 19-20, 1989], initiates growth from the exterior of the molecule, and progresses inward by coupling end groups to each branch of the monomer. More recently, creative synthetic strategies that combined both divergent and convergent synthesis have also been developed by dendrimer chemists. A. Archut, S. Gestermann, R. Hesse, C. Kaufmann, F. Vögtle, *Synlett*, 546-548, 1998. The first reported dendrimer, polyamidoamine (PAMAM), is probably the most studied dendrimer. In 1985 and 1986, Tomalia et al. [.A. Tomalia, H. Baker, J. Dewald M. Hall, G. Kallos, S. Martin, J. Roeck, J. Ryder, and P. Smith, *Macromolecules*, 19(9), 2466-2468, (1986)] described the preparation of PAMAMs by the divergent approach. The synthesis involved in situ branch cell construction in step-wise, iterative stages around a desired core (e.g. ammonia or ethylenediamine (EDA)) to produce defined core-shell structures. For EDA-cored PAMAM as an example, the typical synthesis takes 24 hours for half generations and 96 hours for full generations. M. J. Frechet, D. A. Tomalia, *Dendrimers and other dendritic polymers*. John Wiley & Sons Ltd. (2001).

In half generations of PAMAM the terminal functionality is an ester; for full generations the terminal functionality is an amine. The structure of a generation-2 EDA—cored PAMAM is shown below.

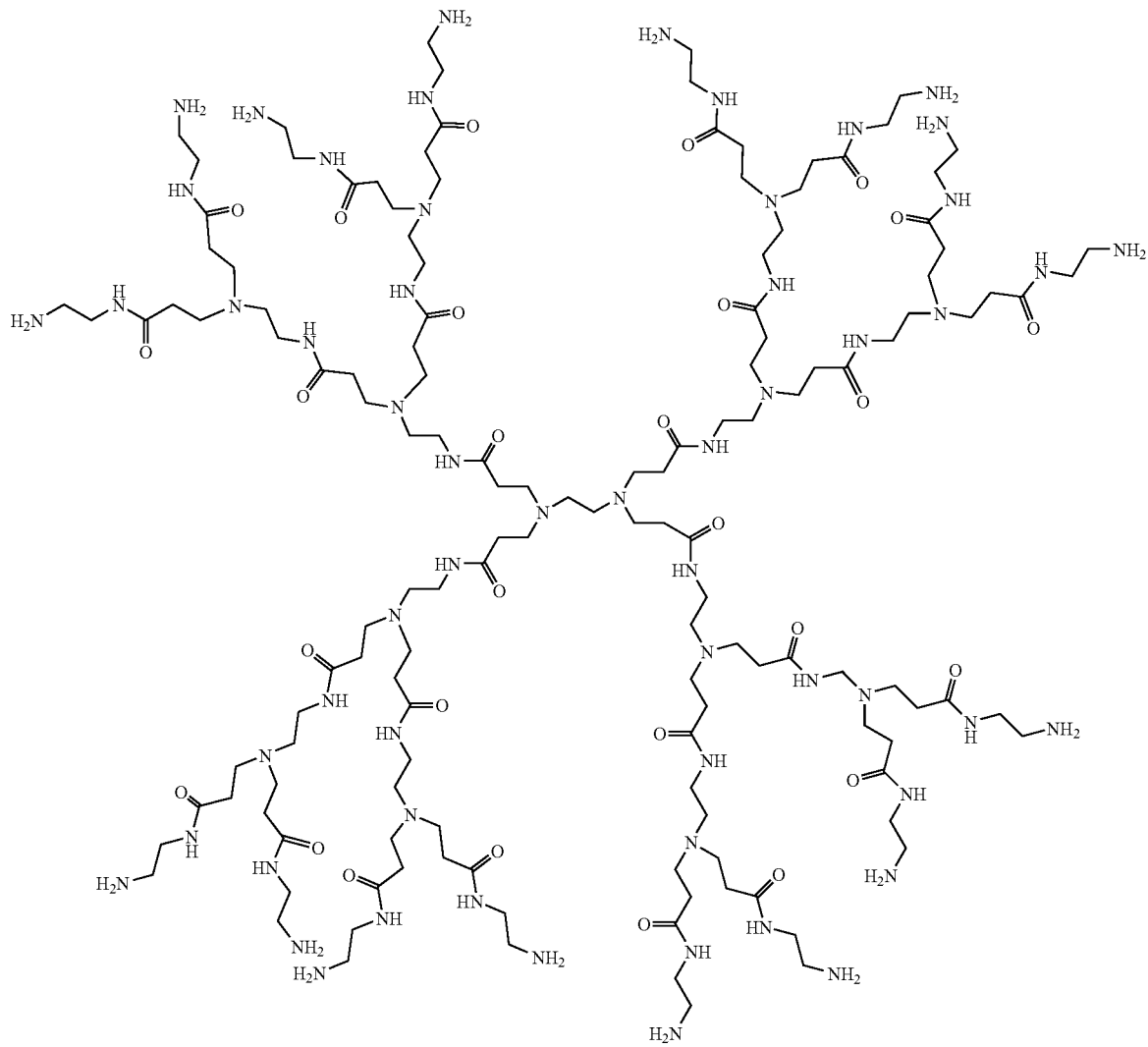

In view of the importance of specialty chemicals, such as dendrimers, new methodologies for their synthesis are desirable. The present invention provides such a new methodology, as well as "nanofactories" designed to synthesize such chemicals cleanly, quickly and efficiently.

SUMMARY

The present invention concerns embodiments of an apparatus and system, and method for their use, for chemical synthesis and/or analysis. One disclosed embodiment of an apparatus comprises a laminated, microfluidic structure having a reactor and a separator. Such apparatuses, or portions thereof, generally have dimensions ranging from about 1 micrometer to about 100 micrometers. "Laminated" indicates that the device is made by microlamination technology, which consists of patterning individual lamina and bonding them together to generate a monolithic device with embedded features. Individual lamina may be made from any suitable material, such as metals, intermetallics, alloys, polymeric materials (including without limitation, polydialkylsiloxanes, polycarbonates, polysulfones and polyimides), ceramics, and combinations thereof.

The reactor portion of the device typically includes a mixing section and a section useful for controlling the temperature of reactants, fluids comprising reactants, etc. For example, disclosed embodiments have a mixing section comprising an interdigital mixer (typically having plural mixing channels with a width of from about 50 μm or less and a length of about 250 μm or less.) or nozzle mixer (typically, but not necessarily, having a nozzle opening of from about 1 μm to about 10 μm and an aspect ratio of 30:1 or greater). The temperature control section may comprise either a heater, such as a thin-film heater, or a cooler.

To implement synthetic processes, disclosed embodiments of the apparatus generally include at least one valve, and often plural, selectively actuatable valves. Fluidly actuatable valves have been made in working embodiments using a fluidly deflectable, elastomeric layer.

Chemical synthesis generally requires separating unused reactants and/or byproducts from desired products. Therefore, certain embodiments of the disclosed apparatus include a separator for separating undesired materials from desired products. Examples of suitable separators, without limitation, include dielectrophoretic separators, electrophoretic separators, templated, sorbent-based separators (e.g., dendrimer-templated separartors), non-templated separators, such as packed beds, capillary electrochromatographic separators, capillary zone electrophoretic separators, and combinations thereof. Detectors, including optical detectors, also can be used to detect product and other materials as they flow by, or are otherwise presented to, the detector.

A particular embodiment of the apparatus, referred to as a microchemical nanofactory, comprises at least a first inlet and a second inlet for feeding a first reagent and a second regent to a mixer. The mixer thoroughly mixes the reagents, often provided in a fluid stream, to form a mixture. The microchemical nanofactory optionally may include a heating or cooling zone for receiving the mixture. Reaction product or products, and other materials that may form or are included as solvents, reactants, etc., are received in a first microchannel that is fluidly coupled to a first separator. The device also may include a second separator, as would typically be the case for plug flow to sorbent-based separators. Moreover, selectively actuatable valves, often fluidly actuatable valves comprising a fluidly deflectable elastomeric layer, are used to guide product and other materials to the first separator, and to the second separator if present, for separating product from the other materials to form a separated product and separated materials. Additional, selectively actuatable valves may be operatively coupled to plural microchannels for guiding the product to a product microchannel and the separated materials to a separated materials microchannel.

A person of ordinary skill in the art will appreciate that individual apparatuses as described herein may be coupled to form a system for making chemical compounds. For example, such a system may comprise a first laminated, microfluidic structure defining a reactor and a separator coupled in series to at least a second laminated, microfluidic structure defining a reactor and a separator. Thus, compounds that require multi-step processes for their synthesis, such as dendrimers, can be made by performing a first reaction in a first apparatus, feeding the product to a second apparatus, typically on the same chip, to perform a second synthetic operation, and repeating such unit operations until the desired compound is completely synthesized. Moreover, individual apparatuses, or systems, can be used in parallel to make as much product as may be required.

Disclosed embodiments of the apparatus, microchemical nanofactories and/or systems can be used in a method for making a myriad of compounds using reagents now known or hereafter developed. Moreover, the apparatus is particularly useful for making compounds that use iterative reaction schemes, and further can be used to make compounds having morphological structures that resemble the morphology of the apparatus itself. For example, the apparatus may employ a fractal geometry that is useful for making, inter alia, dendrimers.

The method typically comprises providing a laminated, microfluidic apparatus defining a reactor and a separator. Reagents appropriate for making a desired chemical compound are then fed to the apparatus, and the apparatus operated to make the desired compound. For example, if the desired chemical compound is a dendrimer, the reagents may comprise ethylene diamine and methylacrylate acid.

However, a person of ordinary skill in the art will readily appreciate that the disclosed embodiments of the apparatus, microchemical nanofactory and systems are not solely useful for making dendrimers, and instead can be used to make a virtually limitless number of compounds. Solely by way of example, classes of such compounds include oligomers, biological macromolecules, simple and complex natural products, supermolecules, commercial polymeric materials, respiratory stimulants, analgesics, behavior-modifying agents, anesthetic agents, anticonvulsants, muscle relaxants, antiarrhythmic drugs, ACE inhibitors, calcium channel blocking agents, vasodilating agents, alpha-adrenergic blocking agents, beta-adrenergic blocking agents, angiotensin converting enzyme blockers, antihypertensive agents, sympathomimetics, bronchodilators, xanthines, antihistamines, antitussives, mucolytics, diuretics; carbonic anhydrase inhibitors, urinary alkalinizers, urinary acidifiers, cholinergic stimulants, urolithiasis agents, antiemetic agents, antacids, H2 antagonists, gastromucosal protectants, prostaglandin E1 analogs, proton pump inhibitors, GI antispasmodics/anticholinergics, GI stimulants, digestive enzymes, antidiarrheals, sex hormones, posterior pituitary hormones, oxytocics, adrenal cortical steroids, mineralocorticoids, glucocorticoids, adrenal steroid inhibitors, anti-diabetic agents, thyroid hormones, endocrine/reproductive drugs, prostaglandins, antiparasitics, anticoccidial agents, aminocyclitols, macrolides, penicillins, tetracyclines, lincosamides, quinolones, sulfonamides, antibacterials, antifungal agents, antiviral agents, clotting agents, anticoagulants, erythropoietic agents, blood modifying agents, alkylating agents, antimetabolites; mitotic inhibitors, antineoplastics, and immunosuppresive drugs. Often, the disclosed embodiments of the apparatus, microchemical nanofactory and systems have a morphological structure representative of the compound made. Reagents and conditions useful for making such compounds will be known to a person of ordinary skill in the art of chemical synthesis, and include reagents and conditions published in the chemical literature, or that are used to make compounds in commercial quantities.

BRIEF DESCRIPTION OF THE DRAWINGS

FIG. 32A illustrates an in-line fractal design for compact production of dendrimers (providing a geometry similar to the geometry used by Professor Deborah Pence for heat exchanger/desorber applications), and FIG. 32B is an exploded view of one of the vertices in the fractal device having an integrated micromixer, heater and separator.

FIG. 33A illustrates an out-of-plane fractal design, and FIG. 33B illustrates modules with integrated heaters and micromixers.

DETAILED DESCRIPTION

Embodiments of the disclosed microchemical nanofactories include combinations of various structures integrated to perform particular tasks, such as an integrated device for chemical synthesis and/or analysis. An integrated device might include, for example and without limitation, one or more of a microinjector, micromixer, microreactor, microseparator, microvalve(s), microdetector and/or microextractor. These components typically have 1 micrometer to 100 micrometer scale dimensions, and methods for making exemplary components, as well as the structure of such components, that are then integrated to form a nanofactory system are described.

I. Chemical Synthesis

A. Dendrimers

The following description exemplifies the invention with reference to a microsystem for the synthesis of dendrimers. However, it will be appreciated that the invention is not limited to the synthesis of these particular compounds. Instead, a person of ordinary skill in the art will understand that embodiments disclosed in the present application can be useful for making a number of different chemical species, and the scope of the present invention should be considered to be directed to the genus of compounds defined by such species.

Throughout nature and at all scales there are examples of the interrelationship between shape and function. Control of structure on the nanometer/macromolecular scale is therefore of great interest in chemistry and engineering. The present invention uses the exquisite three-dimensional structural motifs and startling reproducibility and monodispersity demonstrated in macromolecules as an inspiration for a unique approach to the production of highly ordered and structurally elegant molecules, such as dendritic macromolecules, or dendrimers. Microreactor-based dendrimer production within fractal nanofactories demonstrates the ability to control the hundreds of parallel reactions necessary to economically produce highly ordered dendrimers.

Figure 1A:
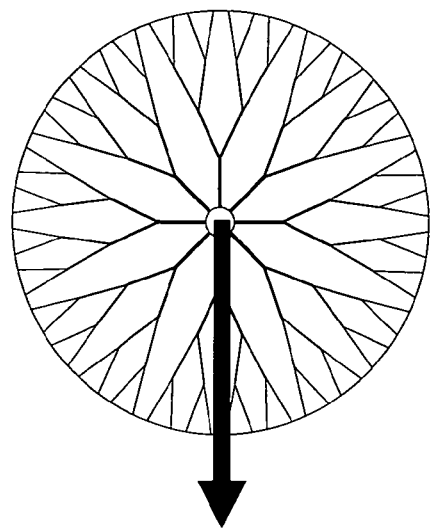
FIG. 1A is a schematic representation of a fractal plate (providing a geometry similar to the geometry used by Professor Deborah Pence for heat exchanger/desorber applications) illustrating microchannel branching in a device useful for producing dendrimers.
Figure 1B:
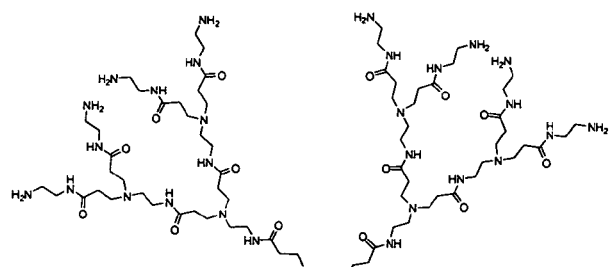
FIG. 1B is a two-dimensional representation of a dendrimer species
Figure 1C:
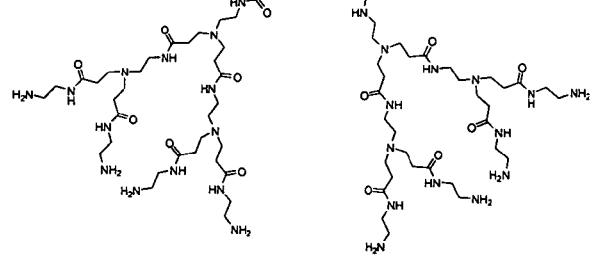
FIG. 1C is a 3-dimensional, space-filling model of the dendrimer species of FIG. 1B.

Dendrimers are highly-branched, nanometer-sized molecules with symmetrical fractal morphologies (FIG. 1). The word dendrimer is derived from the Greek words dendri (branch, tree-like) and meros (part of). Dendrimers consist of a core-unit, branching units, and end groups located on their peripheries. Their dendritic architecture presents great potential for a wide variety of applications. Dendrimers hold great promise as building blocks for complex supramolecular structures and as nanoscale carrier molecules in drug delivery, where nanoparticles and nanocapsules are gaining popularity. The molecules can be assembled with startling precision, a necessity when the goal is construction of nanoscale structures or devices with sophisticated and complex functionality. The limiting factor to fully realize the potential applications of dendrimers is production cost. For dendrimers to realize their full potential, methods must be developed by which the uniformity and efficiency of nature can be closely approximated in the production of these macromolecules. Current methods of production suffer from low yields, high costs and the inability to produce large, higher generation dendrimers. The high rates of heat and mass transfer found in microchannels will provide the basis for greater control of dendrimer synthesis enabling the low-cost production of larger dendrimers while providing an opportunity to explore the fundamentals of their reaction kinetics. The conformation of dendritic macromolecules can be manipulated through micro- and nanofluidic mixers and novel microseparations techniques to minimize excess reagent and defective product to further improve yields in downstream reactions.

A critical barrier to the routine use of dendrimers is the tedious, expensive means of their synthesis. This synthesis consists of two constantly repeating reaction steps involving: 1) coupling a central unit to two branching units; and 2) activating the branches so they can react further. Two general approaches (divergent and convergent) to dendrimer synthesis exist. Divergent synthesis starts from a seed and progresses towards the periphery of the dendrimer, while convergent synthesis proceeds from the periphery to a core.

1. Divergent Synthesis

The divergent approach, arising from the seminal work of Tomalia and Newkome, initiates growth at the core of the dendrimer and continues outward by the repetition of coupling and activation steps. In divergent synthesis, several hundred reactions may be required to obtain five or six dendrimer generations (sizes of interest). In this case the yield for each step multiplies through to determine the total yield. For example, in the synthesis of a fifth generation poly (propylene imine) dendrimer (64 imine groups; 248 reactions), a yield of 99% per reaction will result in only $0.99^{248}=8.27\%$ of defect-free dendrimer. To further complicate matters, the similar sizes of defective and defect-free dendrimers then make separation difficult. Exponential growth in the number of reactions to be performed to produce higher generations makes divergent synthesis an unlikely method for the production of uniform dendrimers beyond generation five or six unless the yield at each step exceeds 99.8%. In addition, extremely excessive amounts of reagents are required in latter stages of growth to reduce side reactions and force reactions to completion. This not only increases the cost but also causes difficulties in purification.

2. Convergent Synthesis

Convergent synthesis initiates growth from the exterior of the molecule, and progresses inward by coupling end groups to each branch of the monomer. The single functional group at the focal point of the wedge-shaped dendritic fragment can be activated after the coupling step. Coupling the activated dendrons to a monomer creates a higher generation dendron. Finally, the globular, multi-dendron dendrimer is generated by attaching the dendrons to a polyfunctional core. Here, a small and constant number of reaction sites are maintained in each reaction step. Consequently, only a small number of side products are possible in each step. As a result, the reactions can be driven to completion with only a slight excess of reagent and defective product can be eliminated prior to subsequent reaction. Thus, convergent synthesis has the potential to produce purer dendrons and dendrimers than divergent synthesis. Furthermore, the ability to precisely place functional groups throughout the structure, to selectively modify the focal point, and to prepare well-defined asymmetric dendrimers make the convergent approach attractive. However, since the coupling reaction occurs only at the single focal point of the growing dendron, the preparation of higher generation dendrons and dendrimers (typically above the sixth generation) is sterically hindered, resulting in decreased yields. This is especially evident in the reaction between high generation dendrons and the core. This drawback has limited the commercialization of dendrimers produced by convergent synthesis. Embodiments of the nanofactories disclosed in the present application address this drawback.

Hence, dendrimers were selected for initial synthesis using embodiments of the disclosed nanofactories for several reasons. First, dendrimers are a genus of useful compounds. Second, the nanofactories may be particularly suitable for making compounds where the structure of the device is representative of the morphology of the end product made using the device. For the branched dendrimers, the fractal nanofactory has a strong resemblance to the morphology of the compound made by the device. Third, dendrimers can be made by an iterative synthesis process, which is amenable to chemical synthesis by a nanofactory since the reactions are repetitive, the separation techniques all can be similar as the molecules produced by the reactions are similar, a limited number of reagents need be mixed, etc.

B. Chemical Synthesis of Compounds other than Dendrimers

A person of ordinary skill in the art will appreciate that nanofactories and methods for their use can facilitate synthesis of a large number of compounds in addition to dendrimers. For example, and without limitation, such compounds include: oligomers, such as molecular wires [see, for example, James M. Tour, *Molecular Electronics, Commercial Insights, Chemistry, Devices, Architecture and Programming*, World Scientific, which is incorporated herein by reference], rods [see, for example, Peter F. Schwab, Michael D. Levin and Josef Michl in *Molecular Rods*, Chem. Rev., 99, 1863 (1999), incorporated herein by reference], oligoenes, oligoynes, oligoenynes, oligoarylenes, oligoacenes, oligoarylenevinylenes, oligothiophene, oligotetrathiafulvalenes, oligoanilines, oligopyrroles [Electronic Materials: The Oligomer Approach, Edited by K. Mullen and G. Wegner, Wiley-VCH, (1998); biological macromolecules, such as polypeptides, proteins, enzymes, antibodies, fibrous proteins, globular proteins, membrane proteins, glycoproteins; polysacharides, oligosacharides: e.g. hyaluronic acid, heparin, chitin, celluose, amylose.; nucleic acids, polynucleotides, oligonucleotides: DNA, RNA, including DNA or RNA analogs oligonucleotides (e.g. antisense oligonucleotides); simple and complex natural products (such as taxol) and mimics of natural products; molecules having useful 3-dimensional shapes, such as supermolecules, one example of which is diamondoid, that typically are constructed using molecular building blocks, such as described by Damian G. Allis and James T. Spencer, *Handbook of Nanoscience, Engineering, and Technology*, 16 (2003), incorporated herein by reference; commercial polymeric materials, now known or hereafter developed, particularly those with oft repeated monomers molecular blocks; respiratory stimulants such as doxapram; analgesics such as meperidine, buprenorphine, acetaminophen; nonsteroidal anti-inflammatory/analgesic agents such as aspirin, ketoprofen, naproxen; behavior-modifying agents such as amitriptyline, imipramine, clomipramine; tranquilizers/sedatives such as diazepam, midazolam, xylazine; anesthetic agents such as pentobarbital, propofol, ketamine; reversal agents such as naloxome, yohimbine, neostigmine; anticonvulsants such as phenobarbital, phenytoin, primidone; muscle relaxants such as methocarbamol, succinylcholine, dantrolene; inotropic agents such as digoxin, digitoxin, dobutamine; antiarrhythmic drugs such as lidocaine, mexiletine quinidine; anticholinergics such as atropine and glycopyrrolate; ACE inhibitors such as benazepril, captopril and enalapril; calcium channel blocking agents such as amlodipine, diltiazem, verapamil; vasodilating agents such as hydralazine, isoxsuprine, nitroglycerine; alpha-adrenergic blocking agents such as phenoxybenzamine, prazosin; beta-adrenergic blocking agents such as atenolol, esmolol, propranolol; angiotensin converting enzyme blockers such as captopril, enalapril; antihypertensive agents such as nitroprusside; bronchodilators, sympathomimetics such as albuterol, clenbuterol, terbutaline; bronchodilators, xanthines such as aminophtlline, theophylline; antihistamines such as doxepin, hydroxyzine, pyrilamine; antitussives such as codeine, butorphenol, hydrocodone; mucolytics such as acetylcysteine; diuretics; carbonic anhydrase inhibitors such as acetazolamide, dichlorphenamide; diuretics; thiazide diuretics such as chlorothiazide, hydrochlorothiazide; loop diuretics such as furosemide, ethacrynic acid; potassium sparing diuretics such as spironolactone; osmotic diuretics such as glycerin, mannitol; agents for urinary incontinence/retention such as ephedrine, oxybutynin, phenoxybenzamine; urinary alkalinizers such as sodium bicarbonate; urinary acidifiers such as methionine, ammonium chloride; cholinergic stimulants such as bethanechol; agents for urolithiasis such as ammonium chloride, methionine, allopurinol; antiemetic agents such as chlorpromazine, meclizine, metoclopramide; antacids such as aluminum gels, calcium salts, sodium bicarbonate; H2 antagonists such as cimetidine, famotidine, ranitidine; gastromucosal protectants such as sucralfate; prostaglandin E1 analogs such as misoprostol; proton pump inhibitors such as omeprazole; GI antispasmodics/anticholinergics such as aminopentamide, isopropamide, propantheline; GI stimulants such as cisapride, dexpanthenol, neostigmine; digestive enzymes such as pancrelipase; antidiarrheals such as diphenoxalate/atropine, bismuth subsalicylate, clioquinol; sex hormones such as estradiol, altrenogest, stanozolol; posterior pituitary hormones, including vasopressin agents such as desmopressin; oxytocics such as oxytocin ;adrenal cortical steroids such as corticotrophin-ACTH; mineralocorticoids such as desoxycorticosterone piv, fludrocortisone; glucocorticoids such as dexamethasone, hydrocortisone, prednisone; adrenal steroid inhibitors such as mitotane, selegiline; anti-diabetic agents such as insulin, chlorpropamide, glipizide; thyroid hormones such as levothyroxine, liothyronine, TSH; miscellaneous endocrine/reproductive drugs such as bromocriptine, chorionic gonadotropin-HCG, follicle stimulating hormone; prostaglandins such as cloprostenol, dinoprost, fluprostenol; antiparasitics such as fenbendazol, ivermectin, praziquantal; anticoccidial agents such as amprolium, decoquinate; antibiotics, aminocyclitols such as amikacin, gentamycin, neomycin; cephalosporins such as cefazolin, cephalothin, ceftiofur; macrolides such as erythromycins, tylosin; penicillins such as amoxicillin, ticarcillin, carbenicillin; tetracyclines such as doxycycline, tetracycline, oxytetracycline; antibiotics, lincosamides such as clindamycin, lincomycin, tilmicosin; quinolones such as enrofloxacin, ciprofloxacin, orbifloxacin; sulfonamides such as sulfadimethoxine, sulfamethoxazole/trimethoprim, sulfadiazine/trimethoprim; miscellaneous antibacterials such as chloramphenicol, clioquinol, metronidazole; antifungal agents such as itraconazole, ketoconazole, amphotericin B; antiviral agents such as acyclovir, interferon alfa-2A; clotting agents such as phytonadione, protamine sulfate, aminocaproic acid; anticoagulants such as aeparin, warfarin; erythropoietic agents such as epoetin alfa, ferrous sulfate, iron dextran; miscellaneous blood modifying agents such as hemoglobin glutamer-200, pentoxifylline; antineoplastics/immunosuppresives; alkylating agents such as chlorambucil, cisplatin, cyclophosphamide; antimetabolites such as cytarabine, methotrexate, thioguanine; antibiotics such as bleomycin, doxorubicin; mitotic inhibitors such as vinblastine, vincristine; miscellaneous antineoplastics such as asparaginase, piroxicam, hydroxyurea; and immunosuppresive drugs such as azathioprine, cyclophosphamide, mercaptopurine.

II. Microlamination

A. General Discussion

Microchemical nanofactories, and/or individual components thereof, can be made by microlamination technology. Microlamination methods are described in several patents and pending applications commonly assigned to Oregon State University, including U.S. Pat. Nos. 6,793,831, 6,672,502, and U.S. patent applications, Nos. 60/514,237, entitled High Volume Microlamination Production Of Mecs Devices, and 60/554,901, entitled Microchemical Microfactories, all of which are incorporated herein by reference.

Microlamination consists of patterning and bonding thin layers of material, called laminae, to generate a monolithic device with embedded features. Microlamination involves at least three levels of production technology: 1) lamina patterning, 2) laminae registration, and 3) laminae bonding. Thus, the method of the present invention for making devices comprises providing plural laminae, registering the laminae, and bonding the laminae. The method also may include dissociating components (i.e., substructures from structures) to make the device. Component dissociation can be performed prior to, subsequent to, or simultaneously with bonding the laminae.

In one aspect of the invention, laminae are formed from a variety of materials, particularly metals, alloys, including intermetallic metals and alloys, polymeric materials, including solely by way of example and without limitation, PDMS, polycarbonates, polysulfones, polyimides, etc., ceramics, and combinations of such materials. The proper selection of a material for a particular application will be determined by other factors, such as the physical, chemical, thermal or mechanical properties of the metal or metal alloy and cost. Examples of metals and alloys particularly useful for metal microlamination include stainless steel, carbon steel, phosphor bronze, copper, graphite, and aluminum.

Laminae useful for the microlamination method of the present invention can have a variety of sizes. Generally, the laminae have thicknesses of from about 1 mil to about 32 mils thick, preferably from about 2 mils to about 10 mils thick, and even more preferably from about 3 to about 4 mils thick (1 mil is 1 one-thousandth of an inch). Individual lamina within a stack also can have different thicknesses.

B. Fabricating Laminae

1. Lamina Patterning

Lamina patterning may comprise any one or a combination of the myriad machining, molding or forming techniques used to fabricate a micro- or macro-scale pattern in the lamina. The pattern produced depends on the device being made. Without limitation, techniques for machining or etching include laser-beam, electron-beam, ion-beam, electrochemical, electrodischarge, chemical and mechanical material deposition or removal can be used. The lamina can be fabricated by both lithographic and non-lithographic processes. Lithographic processes include micromolding and electroplating methods, such as LIGA, and other net-shape fabrication techniques. Some additional examples of lithographic techniques include chemical micromachining (i.e., wet etching), photochemical machining, through-mask electrochemical micromachining (EMM), plasma etching, as well as deposition techniques, such as chemical vaporization deposition, sputtering, evaporation, and electroplating. Non-lithographic techniques include electrodischarge machining (EDM), mechanical micromachining and laser micromachining (i.e., laser photoablation). Photochemical and electrochemical micromachining likely are preferred for mass-producing devices.

A currently preferred method for patterning lamina patterns for prototyping devices is laser micromachining, such as laser numerically controlled micromachining. It is particularly well suited for through-cutting polymers as it leaves little if any residue or burr. Laser micromachining has been accomplished with pulsed or continuous laser action in working embodiments. Machining systems based on Nd:YAG and excimer lasers are typically pulsed, while $CO_2$ laser systems are continuous. Nd:YAG systems typically were done with an Electro Scientific Industries model 4420. This micromachining system used two degrees of freedom by moving the focused laser flux across a part in a digitally controlled X-Y motion. The laser was pulsed in the range of from about 1 kHz to about 10 kHz. This provides a continuous cut if the writing speed allows pulses to overlap. The cutting action is either thermally or chemically ablative, depending on the material being machined and the wavelength used (either the fundamental at 1064 nm, the second harmonic at 532 nm, the third harmonic at 355 nm or the fourth harmonic at 266 nm). The drive mechanism for the Nd:YAG laser was a digitally controlled servo actuator that provides a resolution of approximately 2 μm. The width of the through cut, however, depends on the diameter of the focused beam.

Laminae also have been machined with $CO_2$ laser systems. Most of the commercial $CO_2$ lasers semi-ablate or liquefy the material being cut and because of the generally higher powers, may through-cut laminae in a single pass. A high-velocity gas jet often is used to help remove debris. As with the Nd:YAG systems, the laser (or workpiece) is translated in the X-Y directions to obtain a desired pattern in the material. Because of their inherently larger beam waists, $CO_2$ lasers typically are not as precise as other lower wavelength lasers.

An Nd:YAG pulse laser has been used to cut through, for example, 90-μm-thick steel shims. The line widths for these cuts were approximately 35 μm wide, although with steel, some tapering was observed. For the 90-μm-thick sample, three passes were made using 1 kHz pulse rate, an average laser power of 740 mW, and a distance between pulses of 2 μm. Also, the cuts were made at 355 nm. Some debris and ridging was observed along the edge of the cut on the front side. This material was easily removed from the surface during lamina preparation, such as by surface polishing.

Patterns also have been fabricated in laminae using a $CO_2$ laser. For example, a serpentine flexural spring used in a miniature Stirling cooler has been prepared using a $CO_2$ laser. The $CO_2$ through-cuts were approximately 200 μm wide and also exhibited a slight taper. The width of the $CO_2$ laser cut was the minimum achievable with the system used. The part was cleaned in a lamina preparation step using surface polishing to remove debris.

Pulsed Nd:YAG lasers also are capable of micromachining laminae made from polymeric materials, such as laminae made from polyimides. Pulsed Nd:YAG lasers are capable of micromachining these materials with high resolution and no debris formation. Ultraviolet wavelengths appear best for this type of work where chemical ablation apparently is the mechanism involved in removing material. Clean, sharp-edged holes in the 25-50 μm diameter range have been produced.

2. Lamina Preparation

In another aspect of the invention, lamina fabricating includes lamina preparation. The laminae can be prepared by a variety of techniques. For example, surface brushing, lapping or polishing of a lamina following patterning may be beneficial. Moreover, acid etching can be used to remove any oxides from a metal or alloy lamina. In one embodiment of the invention, lamina preparation includes applying an oxide-free coating to some or all of the laminae. An example of this would be to electroplating gold onto the lamina to prevent oxidation at ambient conditions. In another case, it may be useful to provide an electroplated coating to aid the bonding process. It also may be beneficial to flatten laminae such as with a mechanical press or a vacuum hot press or perhaps by deforming the lamina in tension. Cleaning also may include using common degreaser(s) and/or residue remover(s).

In another embodiment of the invention, lamina preparation includes filling the spaces between the structures and substructures with a material, referred to herein for convenience as a fixative, that holds the structure and substructure together before bonding the laminae and after the fixture bridges are eliminated. For instance, investment casting wax can be used as the fixative to hold together the structure and substructure. The fixture bridges are then eliminated, and the substructure is maintained in contact with the structure by the fixative. The fixative is eliminated during or after bonding the laminae together, thus dissociating the substructure from the structure.

C. Laminae Registration

Laminae registration comprises (1) stacking the laminae so that each of the plural lamina in a stack used to make a device is in its proper location within the stack, and (2) placing adjacent laminae with respect to each other so that they are properly aligned as determined by the design of the device. It should be recognized that a variety of methods can be used to properly align laminae, including manually and visually aligning laminae.

The precision to which laminae can be positioned with respect to one another may determine whether a final device will function. The complexity may range from structures such as microchannel arrays, which are tolerant to a certain degree of misalignment, to more sophisticated devices requiring highly precise alignment. For example, a small scale device may need a rotating sub-component requiring miniature journal bearings axially positioned to within a few microns of each other. Several alignment methods can be used to achieve the desired precision. Registration can be accomplished, for example, using an alignment jig that accepts the stack of laminae and aligns each using some embedded feature, e.g., corners and edges, which work best if such features are common to all laminae. Another approach incorporates alignment features, such as holes, into each lamina at the same time other features are being machined. Alignment jigs are then used that incorporate pins that pass through the alignment holes.

Thermally assisted lamina registration also can be used as desired. Thermally-assisted edge alignment can register laminae to within 10 microns, assuming the laminae edges are accurate to this precision. Additional detail concerning thermally assisted lamina registration is provided by copending application No. 60/514,237, which is incorporated herein by reference. Alternatively, laminae may be aligned by using self-aligning, nested features that can be produced in the laminae during the patterning step. Typically, these features are easier to implement for molding or forming applications, such as injection molding or embossing. They typically require using blind and raised features on respective features of the laminae.

Registration of laminae in a working embodiments typically was accomplished using an alignment jig or by thermal registration. If an alignment jig is used, it must tolerate the bonding step. Thus, in typical microlamination setups, the alignment jig preferably was incorporated into the design of the structure that compressed the stack for bonding. A person of ordinary skill in the art also will recognize that the registration process can be automated.

D. Laminae Bonding

Laminae bonding comprises bonding the plural laminae one to another to produce a monolithic device (also referred to as a laminate). Laminae bonding can be accomplished by a number of methods including, without limitation, diffusion soldering/bonding, thermal brazing, adhesive bonding, thermal adhesive bonding, curative adhesive bonding, electrostatic bonding, resistance welding, microprojection welding, and combinations thereof.

1. Microprojection Welding

Laminae can be bonded to one another at specific sites on the laminae by the novel process of microprojection welding. Microprojection welding comprises patterning lamina with at least one projection, and more typically plural projections, that extends from at least one surface, generally a major planar surface, of the lamina. Selective bonding is accomplished by placing laminae between electrodes and passing a current through the electrodes. The laminae are bonded together selectively at the site or sites of the projection(s). A person of ordinary skill in the art will recognize that a variety of materials suitable for welding can be used to produce the projections, including mild steel, carbon steel, low carbon steel, weldable stainless steel, gold, copper, and mixtures thereof. The welding material (i.e., projections) preferably is made of the same material as the laminae being bonded.

Microprojections suitable for microprojection welding can be produced by both additive and subtractive processes. In one embodiment of the invention, a subtractive process was used to pattern laminae. The subtractive process comprises etching away material from a lamina to produce the microprojections. A person of ordinary skill in the art will recognize that a variety of etching processes can be used, including photochemical and electrochemical etching.

In another embodiment of the invention, microprojections can be patterned on laminae by an additive process. This additive process comprises building up a lamina to produce the microprojections or building up the projections on a lamina prior to lamina patterning. One method of producing the microprojections would involve either etching or depositing projections through a lithographic mask prior to lamina patterning. Lamina patterning should then be conducted with reference to the placement of these projections. For example, if the flapper valve pivot is too close to ring projections, then "flash material" may interfere with the operation of the flapper valve. "Flash material" is extraneous projection weld material or material produced by the welding operation.

Microprojections can have several geometries. For example, individual isolated protrusions can be used. Moreover, continuous lines, rings or any other geometries suitable for the welding requirements of a particular device, can be used to practice microprojection welding of laminae.

In one aspect of the invention, plate electrodes were used to deliver current sufficient to weld the laminae to one another. The laminae that are to be welded together are placed between and in contact with the plate electrodes. Optionally, pressure can be applied to place the laminae in contact with each other or the plate electrodes.

Typical projections of working embodiment had heights of from about 100 µm to about 200 µm, with diameters of about 125 µm or less. If the projections are shorter than 100 µm, electrical shorts may result. The weld nuggets produced by the welding operation had diameters of about 1.5-1.7 mm. It can be important to orient substructures on individual lamina so that weld nuggets produced by the welding process do not overlap, and hence potentially interfere with the operation of, the substructures.

2. Diffusion Soldering

Diffusion soldering is a known method for producing joints. See, for example, D. M. Jacobson and G. Humpston, Diffusion Soldering, *Soldering & Surface Mount Technology*, No. 10, pp. 27-32 (1992), which is incorporated herein by reference. However, diffusion soldering has not been adapted for use in microlamination processes for bonding laminae one to another for MECS devices.

Diffusion soldering of laminae can be practiced using a number of material combinations, including both base metals and alloys and on surfaces that have been metalized. Two of the more versatile combinations are tin-silver and tin-indium. These two diffusion-soldering systems provide a low-temperature bonding process that results in intermetallic strong joints at the material interface.

Another attractive feature is that the bond produced by diffusion soldering can take considerably higher reheat temperatures than most conventional bonding methods. Because of these characteristics, diffusion soldering is well suited for producing microlaminated devices that must operate at moderate temperatures (i.e., up to approximately 500° C.).

The tin-silver system can work on any surface able to withstand moderate temperatures and capable of receiving a plating layer of the requisite metal. For many devices, steel and stainless steel offer a number of attractive characteristics for fatigue strength, magnetic properties, relatively low thermal conductivity (for stainless steel), and corrosion resistance.

The diffusion soldering method first comprises preparing and plating the surface of each lamina. A typical plating process comprises plating with a low temperature material and a high temperature material. These two materials typically produce an intermetallic material by diffusion soldering.

More specifically, diffusion soldering may involve placing a first strike layer, such as a thin strike layer of nickel (approximately 0.5 μm) on a bare surface that will receive the nickel, such as a metal or alloy surface. This layer promotes adhesion of the other platable metals. Strike layers may not be necessary. Then, a second, generally thicker layer, such as a silver layer 1 μm-10 μm, more typically 2-5 μm thick, is plated over the first layer. Copper may be preferred as a bonding agent between the strike layer or the lamina and the high temperature soldering material because of its ability to readily bond to both nickel and silver. Copper can create a copper-silver intermetallic that is weaker than the surrounding material, and hence be the site of material failure in the device. Finally, a third low-temperature material layer, typically tin, is plated 1 μm-10 μm, preferably 2-5 μm thick over the second layer.

Working embodiments-used a stack of laminae having alternating surfaces plated with either high-temperature or high-temperature and low-temperature material, such as silver or silver and tin. The two outside laminae typically have high-temperature material, such as silver, so that the final, bonded stack did not adhere to the alignment jig. If possible, non-bonded internal structures and cavities preferably have the silver layer on their surface. This is to prevent low-temperature material from flowing into features.

The bonding takes place by momentarily raising the stack temperature above the melting point of the low-temperature material (e.g., tin@ 232° C.) under a compression pressure sufficient to achieve the bond. At higher pressures, lower temperatures likely will be required to achieve adequate bonding. Working embodiments have used compression pressures of approximately 2 MPa to about 5 MPa. A compression pressure below about 2 MPa may not provide sufficient pressure to achieve adequate bonding. Air and other oxidizing atmospheres preferably are excluded at this point to avoid the creation of tin oxides and voids. However, with the surface properly prepared, the bonding process is rapid and complete. One important aspect is to maintain sufficiently low temperatures and pressures so that the lower temperature material does not flow into the features, causing restriction of flow therethrough or therein.

Bond strength and re-heat temperatures can benefit by heating the stack for a longer period of time at the bonding temperature, such as at least up to one hour. This allows tin to further diffuse into the silver and produce stronger intermetallic compounds within the joint itself. Some evidence exists for ultimately producing a silver bond interspersed with intermetallic tin/silver particles yielding a high strength, moderate temperature joint. Indium can be used in place of tin to yield an even lower temperature (melting point of indium is 157° C.) bonding process.

3. Miscellaneous Bonding Methods

Polyimide sheet adhesives can be used to bond laminae together. Polyimide is a commercially available, high-strength, high-temperature polymer. For example, Dupont manufactures a polyimide sheet adhesive, Kapton K J. Kapton K J retains adhesive properties and can bond surfaces together when heated and compressed. Polyimide sheets produce moderate strength bonds that also provide good sealing capability.

E. Component Dissociation by Eliminating Fixture Bridges

Component dissociation is accomplished by eliminating fixture bridges. It will be recognized that there are a variety of ways to eliminate fixture bridges, including vaporizing the fixture bridge by heating it to a sufficient temperature, chemically eliminating, such as by dissolving, the fixture bridge, and laser ablation of the fixture bridge. Combinations of these methods also can be used.

One method for vaporizing the fixture bridges comprises capacitive discharge dissociation. Capacitive discharge dissociation comprises applying a current through the fixture bridge sufficient to vaporize the fixture bridge. There are a variety of ways to apply current through a fixture bridge. Working embodiments of the method have placed a first electrode in contact with the structure and a second electrode in contact with the substructure to be dissociated. Current is passed between the electrodes.

In one embodiment of the invention, a DC power source was used to charge a capacitor. The capacitor was discharged to pass current through the electrodes. The temperature, the amount of current, and the power necessary to eliminate the fixture bridge often varies with the particular properties of the fixture bridge, including the material the fixture bridge is made of, its cross-sectional area, and its length.

In another embodiment of the invention, fixture bridges are eliminated by thermochemical dissociation. Thermochemical dissociation has the potential advantage of reducing debris that may be produced during fixture bridge elimination.

Thermochemical dissociation comprises selectively heating the fixture bridges, in combination with chemical elimination. Selective heating of the bridge can be accomplished by applying current to the fixture bridge, heating with a laser and/or focusing a laser on the bridge. One way to apply current through the fixture bridge comprises placing electrodes at or near the ends of the fixture bridge and passing a current between the electrodes. In another embodiment of the invention, heating elements, or some other method for delivering thermal energy, can be used to selectively heat the fixture bridges.

Chemical elimination also comprises applying a sufficient amount of a chemical to eliminate the fixture bridges. The fixture bridges also optionally can be selectively heated to a temperature sufficient to help chemically eliminate them either prior to, subsequent to, or simultaneously with application of the chemical. There are a variety of chemicals that can be used to eliminate the fixture bridges, such as acids, particularly mineral acids, bases, oxidizing agents, and mixtures thereof. The concentration, pH, and temperature sufficient to selectively chemically eliminate the fixture bridges varies with the particular properties of the fixture bridge, including the material the fixture bridge is made of, the cross-sectional area, and the length. Preferably, an acid having a pH of less than about 3 and at a temperature above freezing temperature is applied to the lamina. Preferably, the fixture bridges are heated to temperatures from about 200° C. to about 300° C. If the laminae are made of a copper alloy, cupric chloride or ferric chloride can be used to chemically eliminate the bridge. If the laminae are made of steel, a mixture, such as a 1:1 volume mixture of $HCl:HNO_3$, can be used to eliminate the fixture bridge.

In another embodiment of the invention, fixture bridges are eliminated by laser ablation. In this embodiment, line-of-sight access to the fixture bridges from the exterior of the device is desired: The laser beam should be able to be focused onto the fixture bridge, which may require line-of sight access. UV lasers are particularly useful as they ablate metals as well as polymers and ceramics with little heat affect and very sharply distinguished features. Laser ablation allows the fabrication of preassembled features in materials other than metals, such as polymer and ceramics. An Nd:YAG laser operating in the fourth harmonic (266 nm wavelength) would be an example of a UV laser with sufficient power to perform this operation. Fixture bridges can be eliminated either prior to, subsequent to, or simultaneously with bonding of the plural laminae. In one embodiment of the invention, the fixture bridges are eliminated prior to the bonding of the plural laminae one to another.

The method of this invention can be used to fabricate freeform geometries and microfeatures within a device. Microfeatures are of the size of from about 1 µm to about 100 µm. The methods of the invention can be used to produce micro-scale and meso-scale devices. Micro-scale devices are of the size of from about 1 µm to about 1 mm, preferably from about 1 µm to about 500 µm, and even more preferably from about 1 µm to about 100 µm. Meso-scale devices are of the size of from about 1 mm to about 10 cm, preferably from about 1 mm to about 5 cm, and even more preferably from about 1 mm to about 1 cm. Arrays of preassembled, meso-scale devices can be fabricated with overall sizes of up to about 12.5 centimeters by about 12.5 centimeters.

F. Microlamination Using Polymeric Materials

Many MECS devices require the integration of various types of membranes within a microlaminated stack. Examples include integrating Pd membranes for hydrogen separation within microchannel fuel processing systems, integrating contactor membranes in microchannel absorbers for use in heat pumps, integrating separation membranes into microchannel dialyzers for portable kidney dialysis, and integrating elastomeric membranes into highly-branched networks of microreactors for molecular manufacturing (e.g. dendrimer synthesis). Each case requires integrating heterogeneous materials into a laminated stack. Problems with membrane integration within embedded microchannel systems can include:

1. Membrane materials are typically quite expensive and so it is desirable to minimize the amount of membrane material used. This typically sets the requirement for using a second, less expensive packaging material that needs to be integrated with the membrane material.

2. Membrane materials often have specific nano- or micro-morphologies, which dictate the mass transfer of the membrane. These morphologies are many times sensitive to heat and pressure and other processing conditions. Therefore, these materials cannot be conveniently patterned into geometries compatible with microchannel designs and a mechanism is needed to incorporate the raw material form within the microlaminated stack.

3. Many times the techniques used to bond a single material are complicated when bonding different materials. An example might be the ultrasonic welding or thermal bonding of two polymers with significantly different glass transition temperatures where the form of is compromised before the other is ready for welding. Solvent welding may requires using different solvents for different materials. Plasma oxidation produces excellent welds between polydimethylsiloxane and polyethylene or polystyrene, but may not be useful for other combinations of materials.

4. Membranes often are of a thickness, or are made out of a material, that results in poor stiffness. But, microchannels with interspersing membranes must be produced that do not have significant fin warpage and channel non-uniformities. Channel non-uniformities can lead to flow maldistribution, which can negatively impact the effectiveness of heat exchangers and microreactors.

5. The low modulus of some membranes requires that the layers be thick (on the order of one mm) in order to maintain dimensions. Therefore, in order to reduce the fluid volume of certain microchemical nanofactories while meeting processing and operating requirements, it is desirable to integrate elastomeric capabilities of polymeric materials, such as PDMS, with a stiff material, such as polycarbonate.

While some membranes are excellent candidates as valve membranes or other purposes, they are not a good for packaging. Separation membranes often are highly gas permeable, which can cause evaporation in microchannels and lead to vapor-lock. And, some membranes are not suitable as substrates for thin film deposition of heaters and thermocouples.

G. Membrane Integration Techniques

1. PDMS Integration

One method for bonding PDMS to another surface involves plasma oxidation of the PDMS surface followed by conformality to the faying surface. Plasma oxidation introduces silanol (Si—OH) groups on the surface of PDMS and the condensation reaction of these groups with appropriate groups (such as OH, COOH, ketones) on the surface of another material or PDMS forms a strong bond between the two surfaces and can immobilize the grafted layer. The oxidized PDMS surface ma become inactive if not stabilized in aqueous solution within minutes after plasma oxidation. PDMS also is compatible with only a handful of materials including glass, silicon, silicon oxide, silicon nitride, polyethylene and polystyrene. Silicon and glass surfaces are expensive relative to polymeric surfaces. Polystyrene and polyethylene, which can be grafted to PDMS, are not suitable for thin film deposition. Ticona Topas (COC), Zeonor 1600 and GE HPS1/HPS2 are examples of structural polymers having excellent optical clarity, high modulus, high glass transition temperature (>150° C.) and low gas permeability suitable for thin film deposition. Therefore, integration of PDMS with cheap, structural polymers can be used to make microchemical nanofactories.

One specific approach for integrate PDMS membranes is to formulate copolymers with protected functionality under atmospheric conditions which will polymerize under selective exposure to UV light. Two specific procedures are as follows. Hydride functional (Si—H) siloxanes have been incorporated into silanol elastomer formulations to produce foamed structures. Based on this, a novel and plausible approach to impart bonding character on PDMS, without plasma oxidation, is to incorporate a small amount (less than 1%) of silanol functional siloxane (or polysilsesquioxane) into the vinyl-addition siloxane formulation and selectively cure the blend. Also, a methacrylate or acrylate functional siloxane copolymer (which cures on exposure to UV) can be incorporated into the vinyl-addition siloxane such that selective curing of the blend can be used to achieve bonding of surfaces. Oxygen inhibits the polymerization of methacrylate, so the methacrylate functionality may be protected in the presence of oxygen and unprotected to obtain a reasonable cure when blanketed with nitrogen or argon during UV exposure.

2. Physical Constraint of Membranes

Another approach to membrane integration is to physically constrain membrane layers between stiff layers of molded polymers (e.g. Ticona Topas COC, Zeonor 1600 and GE HPS1/HPS2). Because of the stiffness of these materials, each makes an excellent candidate for ultrasonic welding. In addition, as thermoplastics, each has the ability to be thermally bonded (PDMS has a degradation temperature well above the Tg of these materials) and solvent welded.

3. Ultrasonic Welding

Ultrasonic welding enables integration of the microinjection, microreaction, microseparation, detection and microextraction subsystems within a microreactor design for synthesizing chemical compounds, such as dendrimers. Dead space within the microsystem is minimized by using stiff polymer films in place of thick PDMS substrates. These same concepts of physical constraint can be extended to many different heterogenous microlaminated platforms.

Methods employed in the fabrication of test articles include micro hot embossing, laser micromachining and spin casting. A PDMS valve membrane may be sandwiched between two polycarbonate layers using ultrasonic welding. In order to accomplish this, angled channels are CNC machined into the stainless steel substrate after Ni electroforming and resist stripping. These form raised ridges during embossing that act as energy directors for ultrasonic welding.

Figure 15A:
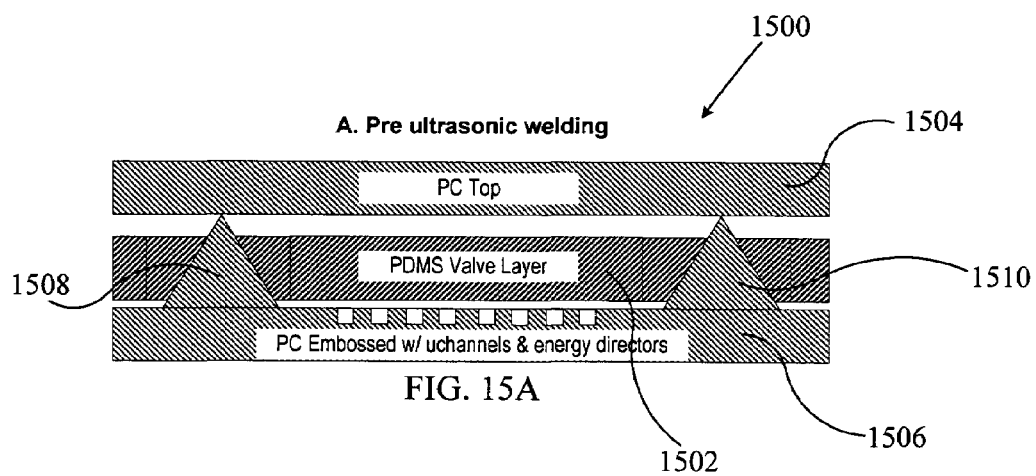
FIG. 15A is a schematic drawing illustrating an ultrasonic welding method for positioning an elastomeric valve layer between other layers in the production of a fluidly actuatable valve prior to welding.
Figure 15B:
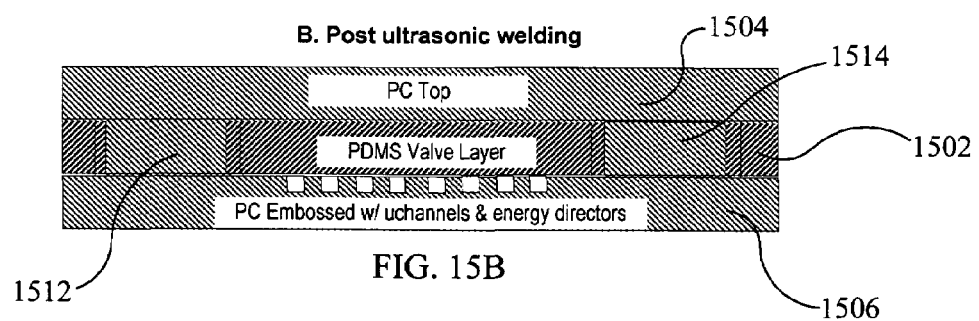
FIG. 15B is a schematic drawing illustrating the system of FIG. 15A after ultrasonic welding.
Figure 15C:
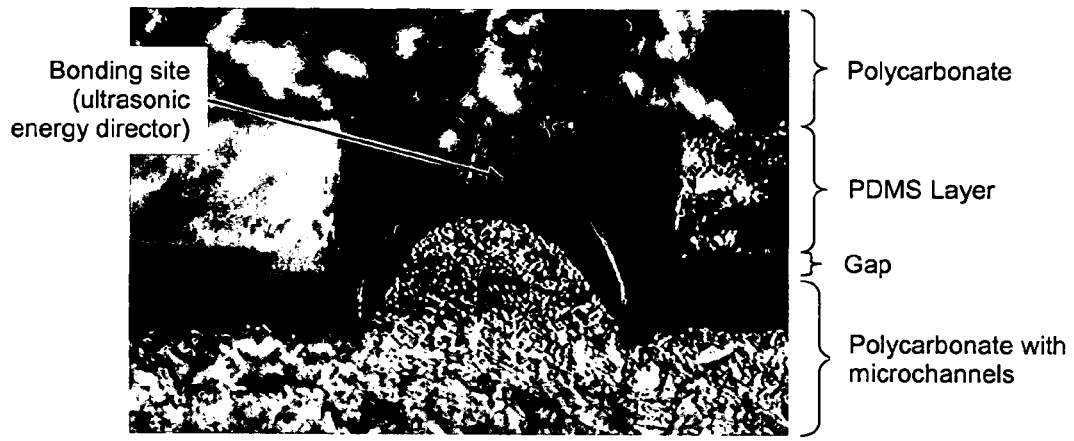
FIG. 15C is a photomicrograph of a working embodiment of a valve schematically illustrated in FIG. 15A prior to welding.
Figure 15D:
FIG. 15D is a photomicrograph of a working embodiment of a valve schematically illustrated in FIG. 15B subsequent to welding.

The elastomeric valve membrane layer is formed by spin casting PDMS monomer onto a wafer with raised photoresist features that form the valve chambers, curing, and then laser machining openings for protrusion of the ultrasonic energy directors. This PDMS membrane layer could be replaced by any type of off-the-shelf membrane. FIG. 15A shows a diagram of a cross section before ultrasonically welding with the energy directors protruding above the PDMS layer. FIG. 15B diagrams the result of ultrasonic welding with the energy directors melted down and bonding the top and bottom PC films and compressing the PDMS layer and sealing the microchannels. FIGS. 15C and 15D are photomicrographs of working embodiments or such systems.

III. Micromixer

The present invention is particularly directed to an integrated "factory" that includes various structures useful for making and/or analying compounds. Embodiments of various individual components that also may have utility when used alone are discussed first, followed by descriptions of various embodiments of integrated devices.

Most chemical syntheses involve mixing two or more reagents together to facilitate reaction and formation of desired products. As a result, micromixers are a first example of a unitary device that can be incorporated into an integrated factory.

Microreaction technology offers several new opportunities to suppress the competing side reactions and maximize the purity of products made. With respect to dendrimer synthesis, the conversion rate of the alkylation/amidation reaction sequence may be increased by enhancing effective collision between reactants to create a microfluid (mixing of reactants at the molecular level) rather than a macrofluid (aggregates of separate reactants).

Mixing typically involves integration of one or more fluids into one phase and molecular diffusion is usually the final step in all mixing processes. A simple estimation shows that it will take five seconds to mix two contacting 100 µm-thick aqueous laminar layers containing small molecules and would only take 50 milliseconds if the layers were 10 µm. The essence of mixing thus relies on the concept of volume division. One common approach to achieve volume division is through creation of a turbulent flow. The fluid is subdivided into thinner and thinner layers by eddies. A large number of mixing apparatuses use this approach. It is difficult to achieve uniform mixing at the micrometer scale in a short time using traditional mixing apparatuses, such as paddles or propellers in a reaction tank. This is evident in many cases where the experimental measured kinetics depends strongly on the stirring conditions even in a laboratory scale reactor. Micromixers offer features which cannot be easily achieved by macroscopic devices, such as ultrafast mixing on microscale. For example, Bökenkamp et al. fabricated a micromixer as a quench-flow reactor to study fast reactions (millisecond time resolution). D. Bökenkamp, A. Desai, X. Yang, Y.-C. Tai, E. M. Marzluff, S. L. Mayo., Anal. Chem. 70, 232-236, 1998.

A variety of micromixers have been reported in the literature including static and dynamic mixers. See, for example, Lowe, H., W. Ehrfeld, V. Hessel, T. Richter and J. Shiewe. 2000. "Micromixing Technology," Proceedings of IMRET 4, AIChE Spring National Meeting, Atlanta, Ga., pp. 31-47; J. B. Knight, A. Vishwanath, J. P. Brody, R. H. Austin, Phys. Rev. Letts. 80(17), 3863-3866, 1998; N. Schwesinger, T. Frank, and H. Wurmus, J. Micromech. Microeng. 99-102, 1996; A. D. Stroock, S. K. W. Dertinger, A. Ajdari, I. Mezić, H. A. Stone, G. M. Whitesides, Science 295, 647-651, 2002; H. H. Bau, J. Zhong, M. Yi, Sensor Actuators B 79, 207-215, 2001; and M. Oddy, J. G. Santiago, J. C. Mikkelsen, Anal. Chem. 73, 5822-5832, 2001. The envisioned applications involve miscible fluids with high diffusivity in one another and are therefore amenable to static diffusional mixing. Sub-second mixing times exist in the literature for static, diffusional mixers. See, Ehrfeld, W., K. Golbig, V. Hessel, H. Lowe and T. Richter. 1999. "Characterization of mixing in micromixers by a test reaction: Single mixing units and mixer arrays," *Ind. Eng. Chem*. Res. 38(3): 1075; and van den Berg, A. 1998. "Miniaturized systems for chemical and biochemical analysis," *CIT* 70(9): 1076.

A. Interdigital and Nozzle Micromixers

Figure 2:
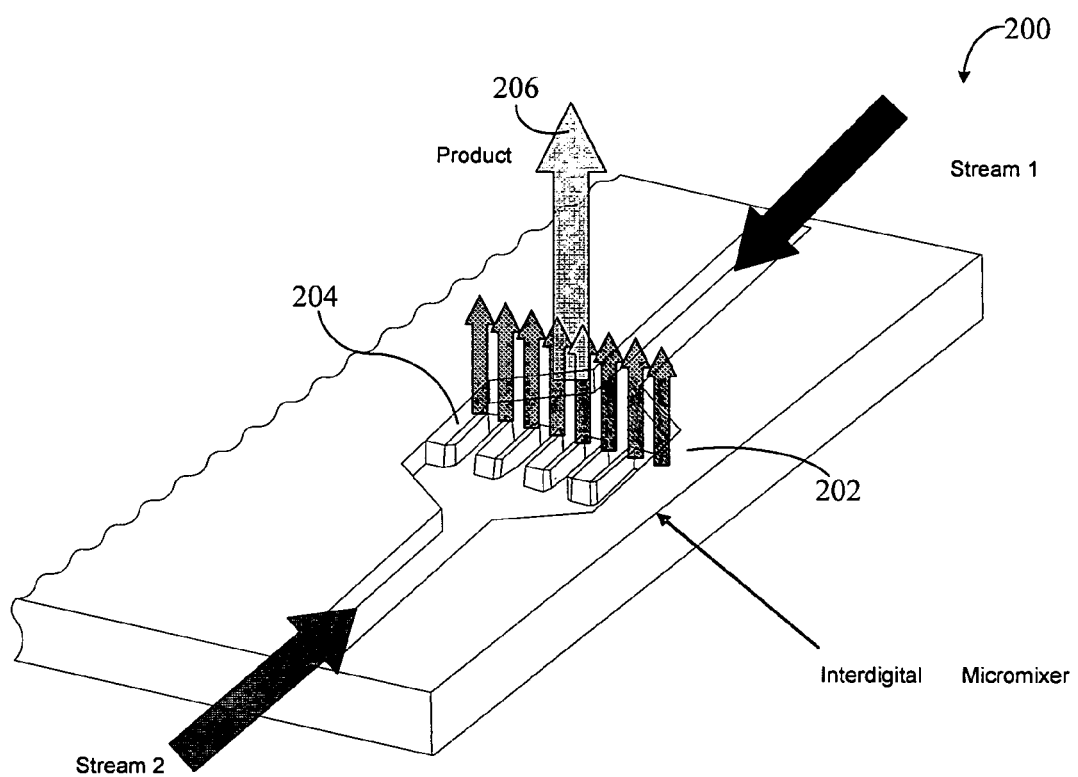
FIG. 2 is a schematic diagram of one embodiment of an interdigital micromixer.

Interdigital (FIGS. 2 and 3A-3B) and nozzle shape (FIG. 4) micromixer designs exemplify embodiments of micromixers useful for integration in a nanofactories. FIG. 2 lillustrates one embodiment of an interdigital micromixer 200. Fluids A and B to be mixed are introduced into the mixing element 202 as two counter-flows. Mixing element 202 includes plural interdigital channels 204, each of which typically has a channel width of from about 20 µm to about 50 µm. Fluids A and B split into many interpenetrated substreams. Substreams 206 exit the interdigital channels 204 perpendicular to the direction of the feed flows A and B, initially with a multilayered structure. Mixer 200 can be manufactured using polymeric microlamination architecture using replica molding/polymer embossing and various bonding strategies. Spacing between digits on the order of 20 µm likely can be achieved providing mixing times on the order of a few hundred milliseconds depending upon flow rates. Such mixers have been used by the present inventors to generate a cadmium sulfide (CdS) nanoparticle solution using a PDMS interdigital micromixer. Stable monodispersed CdS nanoparticle suspensions were produced even without adding stabilizers.

Figures 3A, 3B:
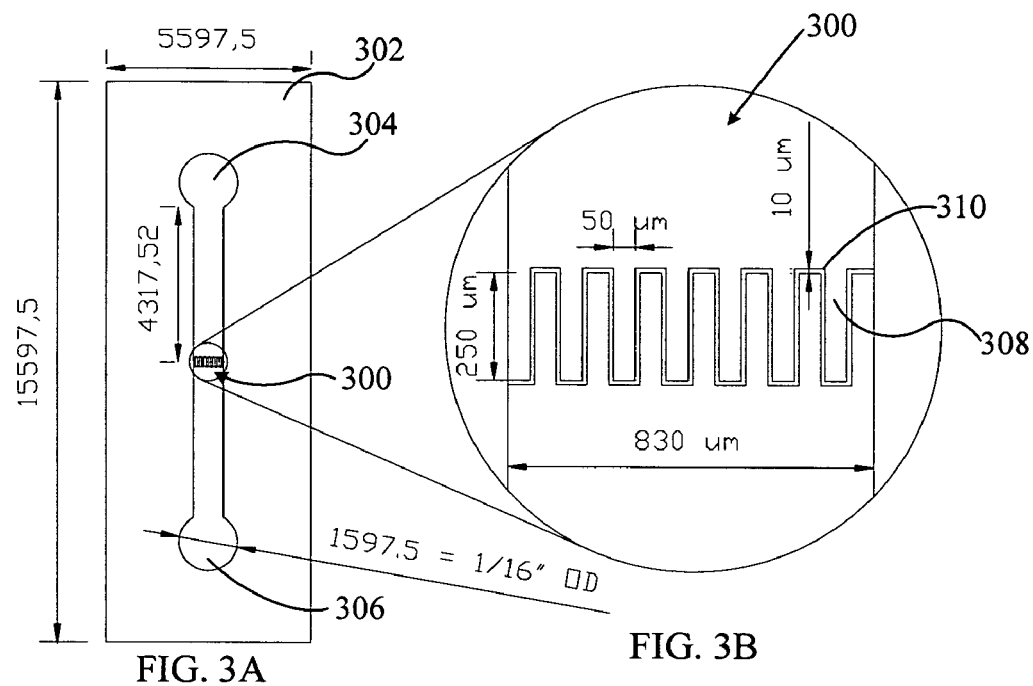
FIG. 3A is a schematic plan view of one embodiment of an interdigital micromixer with micrometer dimensions.
FIG. 3B is an exploded view of the mixing portion of the interdigital micromixer illustrated in FIG. 3A.

FIGS. 3A and 3B also illustrate an interdigital mixer 300. FIG. 3A illustrates an interdigital mixer 300 as part of a lamina or laminae 302 that defines ports 304 and 306 for fluid flow. Exploded view 3B provides dimensions for one embodiment of such an interdigital mixer 300. It will be understood that these dimensions are exemplary only. For the illustrated mixer 300, fluids flowing to the mixer 300 enter channels 308 having a width of approximately 50 µm and a length of about 250 µm. The overall width of the mixer 300 is about 830 µm, and the thickness of the wall 310 defining the mixer is about 10 μm. As with the embodiment of FIG. 2, counter flowing fluids impinging the mixer 300 create a combined fluid stream (not shown) that thereafter flows perpendicular to the flow direction of the two initial streams.

Figure 4:
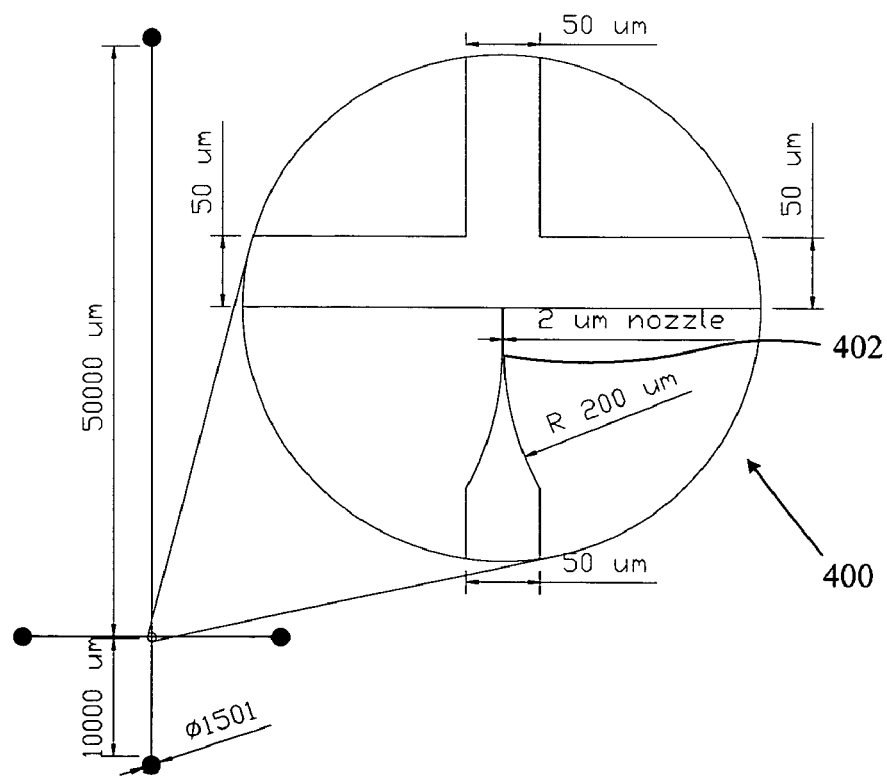
FIG. 4 is a schematic view of one embodiment of a nozzle micromixer.

FIG. 4 illustrates an embodiment of a nozzle mixer 400. Micromixer 400 has a nozzle 402 of from about 2 to about 10 μm with relatively high aspect ratios typically greater than about 30:1. These aspect ratios are currently beyond the limit of planing and micro hot embossing techniques, and hence UV photolithography in thick resist (SU-8) are used to make embodiments such as the micromixer 400. To package the device, a thin layer of silica will be sputter coated onto the surface of SU8 and a thin layer of an elastomer, such as polydimethylsiloxane, will act as a seal between the SU8 structure and a polycarbonate substrate. A working embodiment of mixer 400 will have layers in the following order: glass or polycarbonate, PDMS, silica, SU8, and stainless steel or silicon wafer substrate.

To perform photolithography, a photomask had to be designed, and was sent to Photo-Sciences for production. By using an optical microscope, the dimensions on the photomask all met the requirements of the illustrated design to allow production of a nozzle mixer 400 that has a 1.1 μm nozzle opening and 19.4 μm channel.

Figure 5:
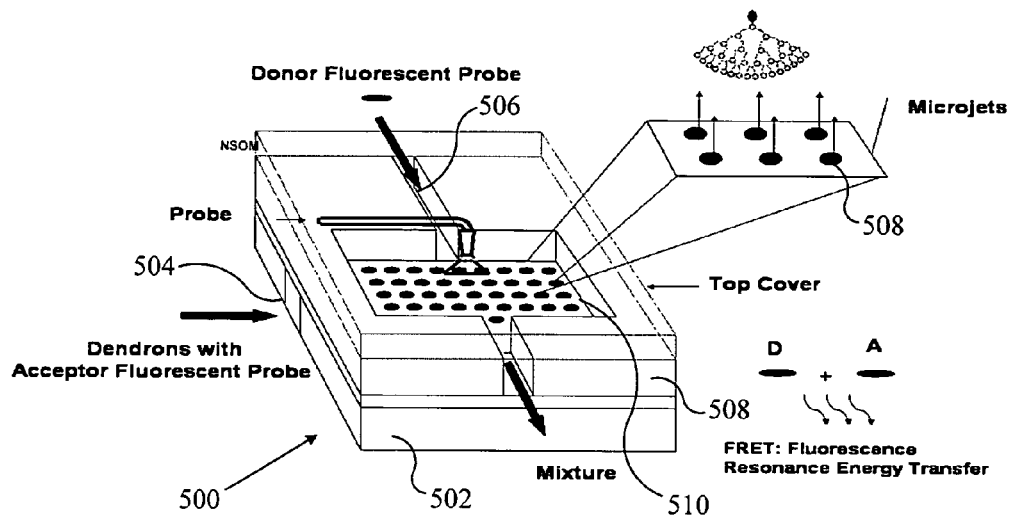
FIG. 5 is a schematic diagram of one exemplary analytical micromixer with a near field scanning optical microscopy (NSOM) probe.

Still another embodiment of a suitable mixer is illustrated in FIG. 5. Mixer 500 can be made using a microlamination architecture. The illustrated embodiment of mixer 500 includes a first layer 502 that defines a first microchannel 504 for introduction of fluid flow to the mixer 500. A second fluid may be introduced by a second microchannel 506 produced either in the same layer 502 or a separate layer 508 as with the illustrated embodiment. A first fluid flowing in microchannel 504 is then introduced into a mixing area 510 that includes plural mixing ports or microjets 512 (see the exploded view 5B).

Additional examples of planar microjet mixers have been made. For example, membranes with straight-through pores down to 5 μm have been laser micromachined in 75 μm thick Kapton KJ and micromolded in 40 μm thick. Even at 100-μmspacing between pores at a mass flux of 0.5 g/min/cm$^2$, pressure drop across the membrane has been measured to be only a few torr.

Figure 6:
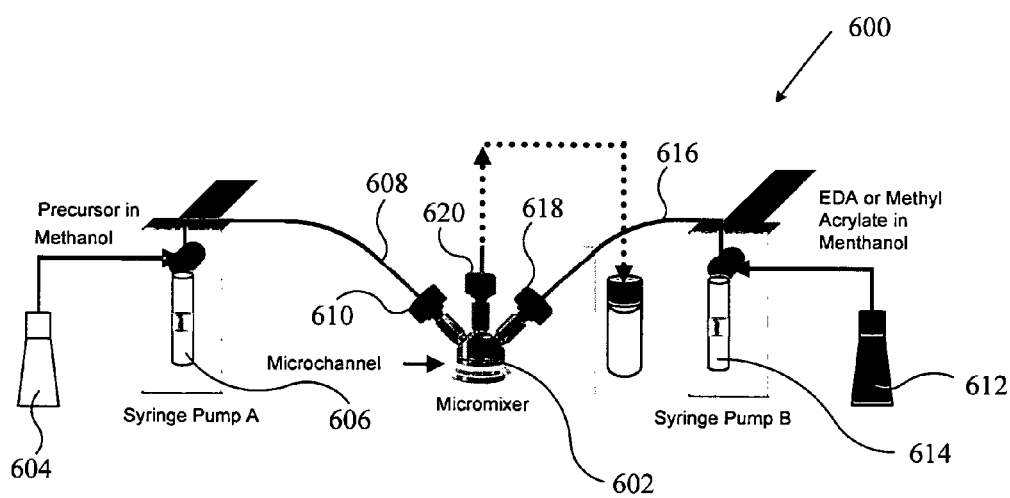
FIG. 6 is a diagram of a continuous reaction system comprising a commercially available micromixer.

Certain embodiments of micromixers are commercially available. One such mixer 602 is illustrated in FIG. 6. Micromixer 602 is not a chip-based mixer, nor is it integrated with other components that might be compiled to define a chip-based microfactory as contemplated herein. Interdigital micromixer 602 (SSIMM from Institut fulr Mikrotechnik Mainz, Germany) consists of interdigital microchannels (not shown) embossed in the center of the substrate made of thermally grown silicon dioxide. The mixing element is hosted within a stainless steel container. Each microchannel has a dimension of 30 μm in width and 100 sum in length.

Microreactors improve mixing and heat transfer due to short diffuision pathways, and large interfacial areas per unit volume (10,000~50,000 m$^2$/m$^3$), respectively. In contrast, conventional reactors only have the ratio of the area versus volume with 100 m$^2$/m$^3$. These two features improve yield and selectivity, specifically for mass-transport controlled reactions, highly exothermic or endothermic reactions and reactions with inherently unstable intermediates. In addition, another attractive advantage is that laboratory scale reactions typically conducted with such micromixers can be easily increased for large production scale by operating plural such microreactors in parallel.

Microreactors suppress the competing side reactions and maximize the purity of products by uniform and precise temperature control, low moisture permeability, and increasing the conversion rate of the alkylation/amidation reaction sequence by effective reactant mixing. Mixing typically relies on volume division and follows by integration of one or more fluids into one phase.

EDA-core PAMAM synthesis has been accomplished using the continuous flow microreactor 602 of FIG. 6. Microreactor 602 was used in a system 600 for the synthesis of the PAMAM dendrimers. System 600 includes a container 604 for delivering a precursor in a suitable solvent, such as methanol, to mixer 602. Syringe pump 606 pumped the precursor through fluid line 608 to an inlet port 610 of micromixer 602. A second container 612 contained a reactant, such as EDA or methyl acrylate in a suitable solvent, such as methanol. A second syringe pump 614 delivered the reactant to the micromixer 602 via fluid line 616 through fluid inlet port 618 of micromixer 602. Product was then delivered through outlet port 620 of micromixer 602.

B. Dendrimer Synthesis Using Micromixer 602

The construction of an EDA-cored PAMAM includes a series of iterative steps. The first two consecutive steps include: Michael addition of EDA to methyl acrylate followed by amidation of the formed tetraester with EDA. These reactions are illustrated in Scheme 1. Higher generation dendrimers are synthesized following the same procedures either with generation-0.5(G-0.5) or generation 0.0(G0.0).

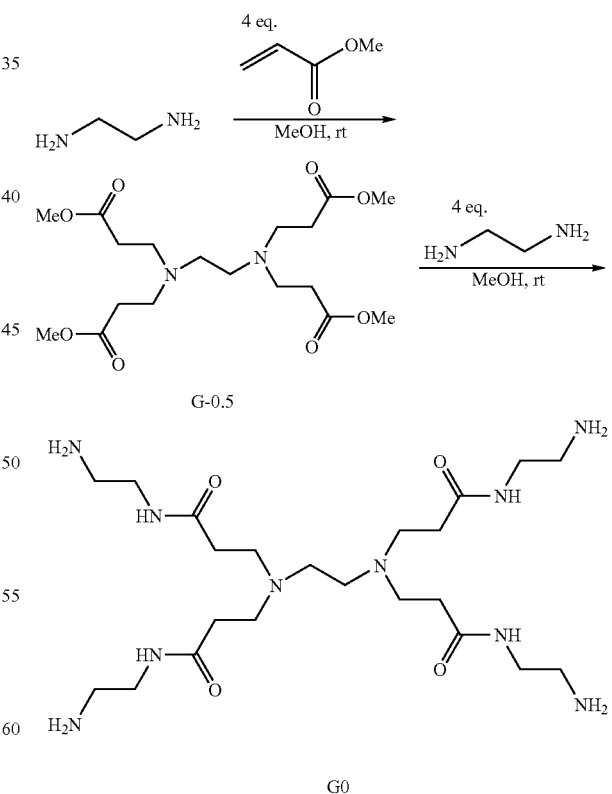

Scheme 1-Synthesis of PAMAM dendrimer of G-0.5 and G0.0

The reactions are exothermic, so coolers and stirrers are used in conventional synthesis of the PAMAM to avoid hot spots, which cause side reactions. The amidation reaction (synthesis of full generations) can form cyclic compounds derived from intra-dendritic cyclization (Scheme 2). These problems inevitably increase the synthetic difficulty and post-separation processes, especially for large-scale synthetic processes. In case of poor mass transfer, the intra-molecular amidation that gives rise to the cyclic product will have more opportunities to occur. To remedy this, a large excess of EDA (50 equivalents) and prolonged reaction times (96 hours) are normally employed for the conventional synthesis of full generation PAMAM.

each stream was divided by the micro-scale channels into many thin substreams, which leave the channels perpendicularly to the direction of feed flows and are mixed at the outlet of the micromixer 602. The mixed solution passes through outlet 620 of the micromixer 602 and the tube connected with the outlet with an estimated mean residence time of 1.08 seconds. The adduct solution was collected, solvent was removed by a rotary evaporator, and trace residue of labile reactants was removed under vacuum (0.1 mm Hg, 40° C.).

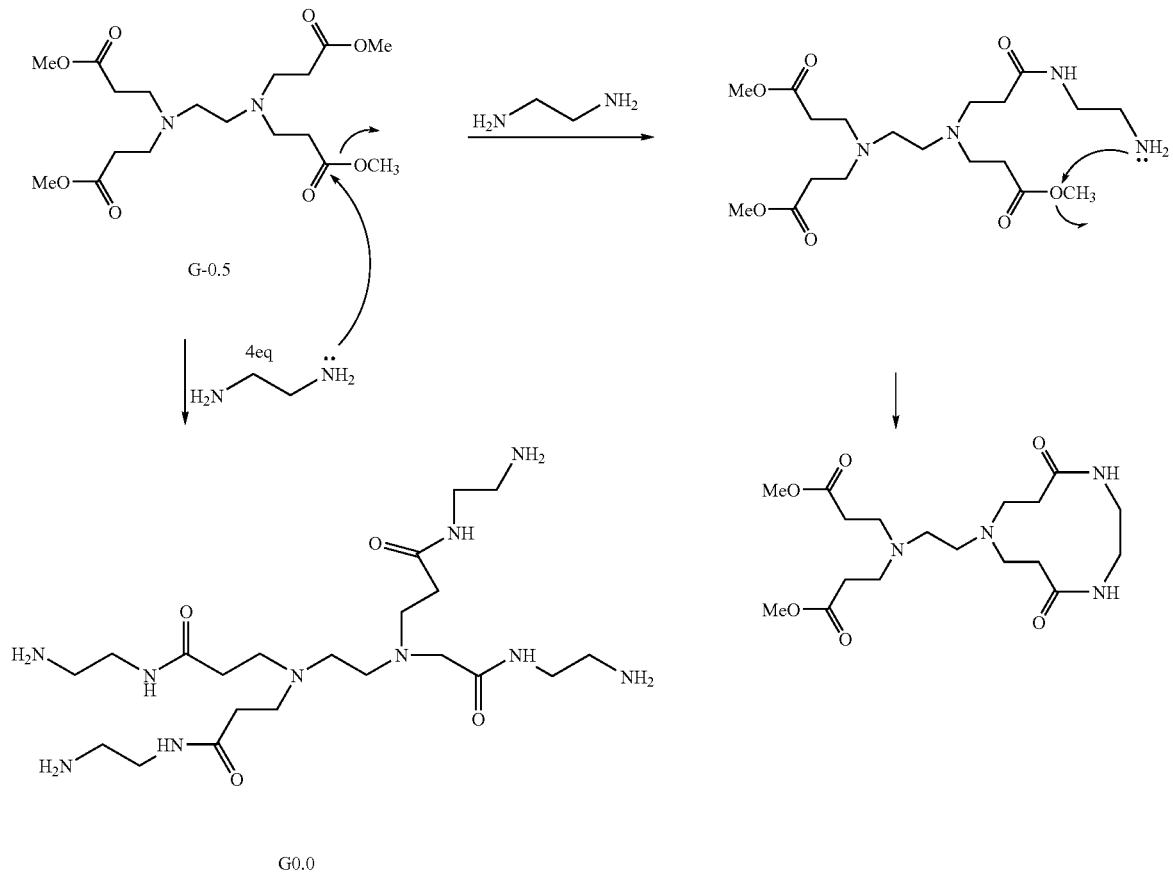

Scheme 2-Non-ideal amidation (cyclization) of EDA-core PAMAM

The conventional synthesis of EDA-cored PAMAM has hindered its potential. An economically and time efficient approach to improve the synthetic process will be valuable. Dendrimer synthesis can benefit by highly-paralleled, process-intensified microsystems. Microreaction technology transforms current batch nanoproduction practices into a continuous process with rapid, uniform mixing and precise temperature control. This was demonstrated by using continuous microreactor 602 to synthesize EDA-cored PAMAM dendrimer.

A methanol solution of precursor and a methanol solution of reagent, either EDA (for synthesis of full generations) or methyl acrelate (for synthesis of half generations), were fed into the mixing element of micromixer 602 through the two micromixer's inlets 610, 618, respectively by means of syringe pumps 606 and 614 at room temperature. Once the solution streams were introduced into the micromixer 602, The first two reactions of EDA-cored PAMAM were conducted using continuous flow microreactor 602. Starting from the synthesis of the first generation G-0.5 with the starting materials of EDA and methyl acrylate in a solution of methanol, G-0.5 was prepared with 99% yield without observing any side product. Sequentially, generation G-0.0 was synthesized from the starting materials of G-0.5 and an excess amount of EDA with a yield of 98% and without observing any side product.

Dendrimers are difficult to characterize due to their macromolecular size and their highly symmetrical structure. A combination of $^1$H NMR spectroscopy and mass spectroscopy were used to determine the structures and purity of the products from the microreactor system 600 and as produced by conventional batch reactor. NMR spectra were recorded in deuterochloroform, with a 300 MHz Bruker nuclear magnetic resonance spectrometer. Mass spectra were collected using a JEOL MSRoute mass spectrometer in the positive fast-atom bombardment ionization mode.

Figure 7:
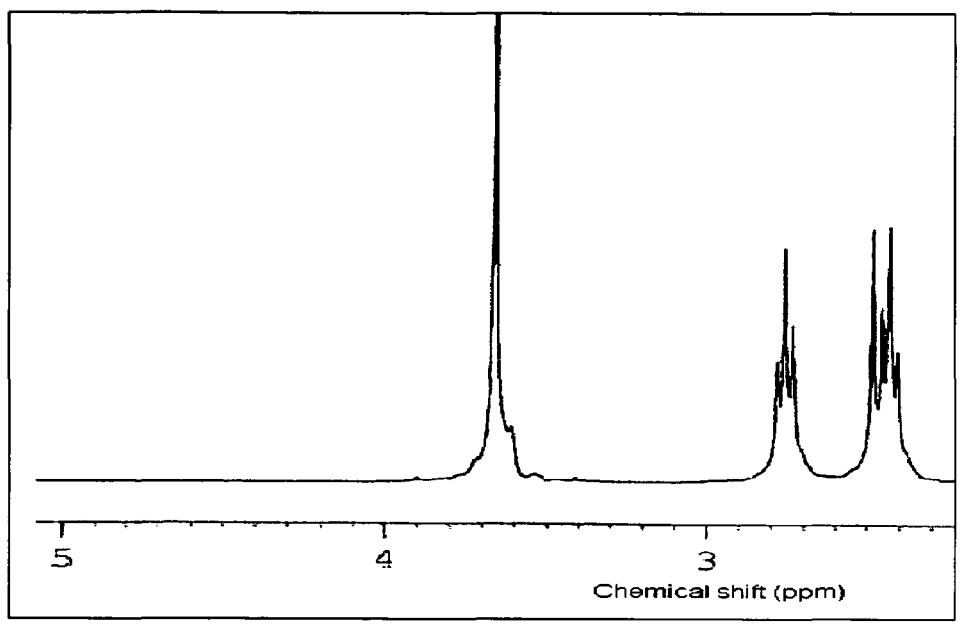
FIG. 7 is an NMR spectrum of PAMAM G-0.5 synthesized by conventional means in a reaction flask for 3 days.
Figure 8:
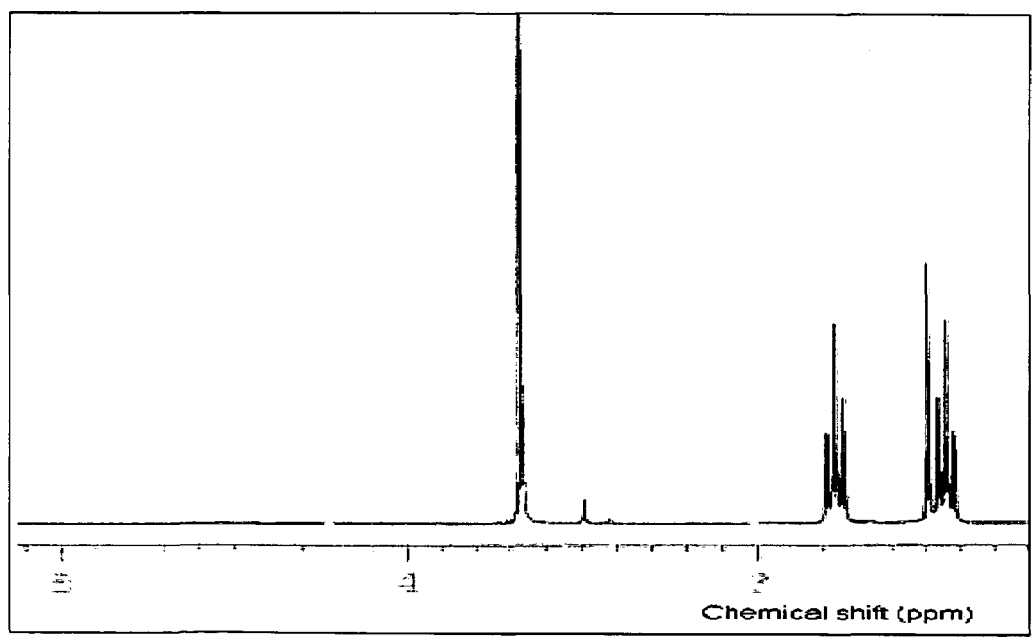
FIG. 8 is an NMR spectrum of PAMAM G-0.5 synthesized by the continuous reaction system illustrated in FIG. 6.

FIGS. 7 and 8 show the NMR spectra of generation G-0.5 synthesized using a conventional approach and in the microreactor system 600, respectively. The NMR results indicated no side products were produced using microreactor system 600. On the other hand, the NMR spectrum from the batch reactor shows some side products (shoulders appeared at peak 3.67 ppm in FIG. 7) even after 3 days of vigorous mixing. The side reaction could be caused by intra-dendrimeric cyclization. The detailed NMR spectral characterization is described as follows: the molecular formula of G-0.5 is $(^aCH_2{}^aCH_2)[N(^bCH_2{}^cCH_2{}^dCO_2{}^eCH_3)_2]_2$. In the NMR spectra of G-0.5 displayed FIG. 7 and FIG. 8, the single peak at 3.67 ppm is assigned to proton 'e'; the triplet peak centered at 2.76 to proton 'b'; the single peak at 2.49ppm to proton 'a'; the triplet peak centered at 2.44 to proton 'c'.

Figure 9:
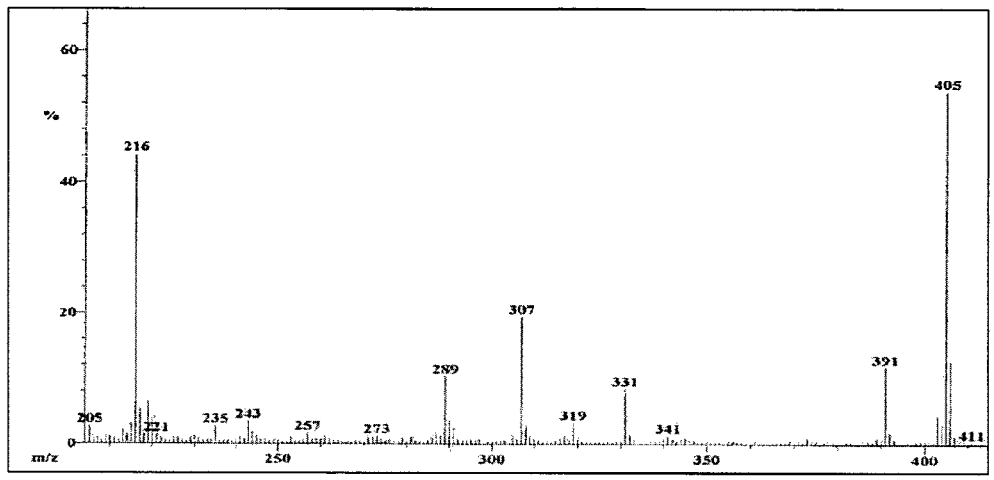
FIG. 9 is an MS spectra of PAMAM G-0.5 synthesized by the continuous reaction system illustrated in FIG. 6.
Figure 10:
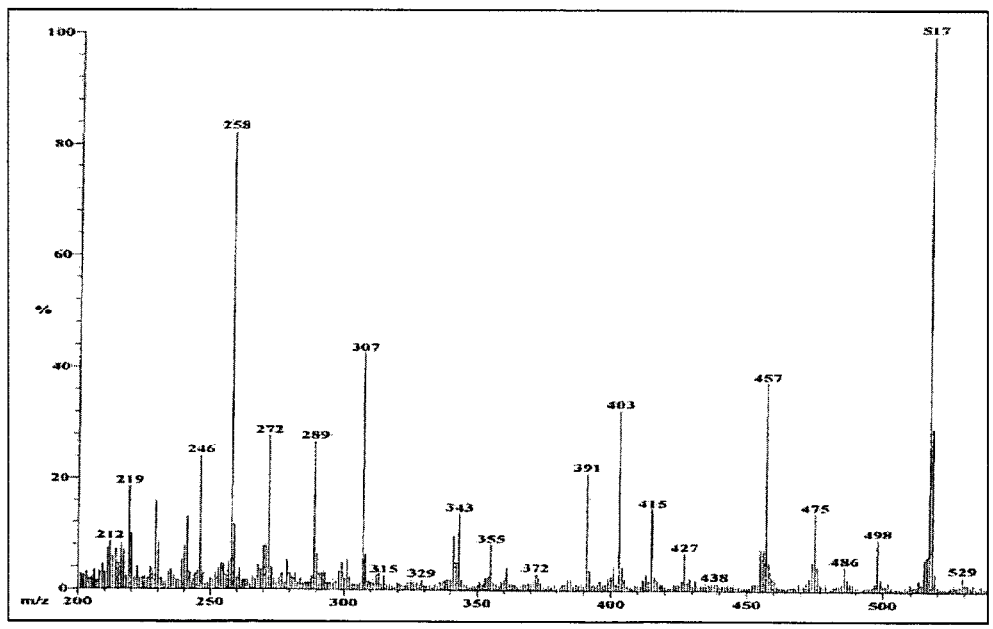
FIG. 10 is an MS spectra of PAMAM G0.0 synthesized by the continuous reaction system illustrated in FIG. 6.

Mass spectra of G-0.5 (molecular weight of 404) and G0.0 (molecular weight of 516) synthesized in a microreactor are shown in FIGS. 9 and 10, respectively. The strong peaks at m/z 405 (M+H) and m/z 517 (M+H) indicate the successful microreactor synthesis of G-0.5 and G0.0 products.

Microreactor system 600 demonstrated several advantages over the conventional batch process. The conventional reaction requires cooling and stirring systems, dropwise addition of reagents at the beginning to conduct the released heat, and inert gas protection. In contrast, all reactions conducted using micromixer system 600 were continuous flow at ambient temperature without using an inert atmosphere. Moreover, plural syntheses of EDA-cored PAMAM dendrimers using micromixer 602 showed good reproducibility. The most attractive advantage is that the residence time for micromixer 602 is 1 second versus 72 hours (for half generation product) and 96 hours (for full generation product) in a conventional batch reaction. In addition, by achieving the high purity of the low generations PAMAMs, further syntheses for higher generation products are considerably eased.

IV. Microextractor

Figure 11:
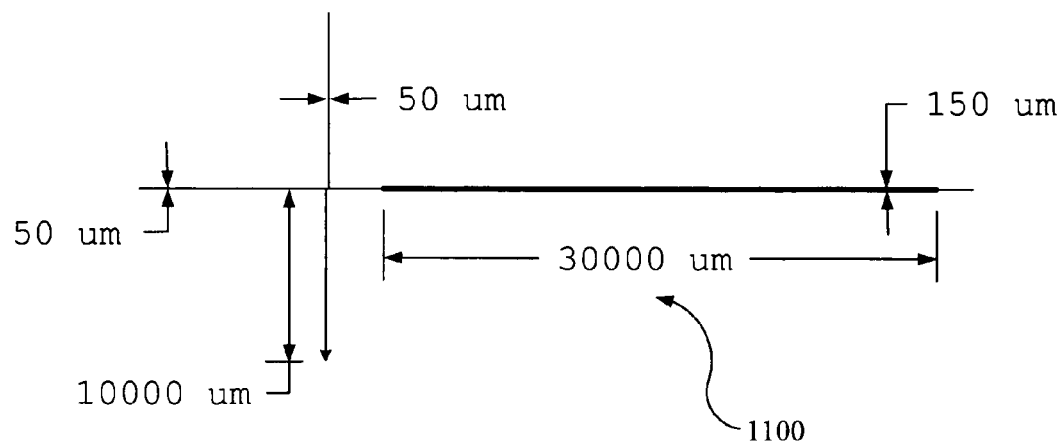
FIG. 11 illustrates one embodiment of a microextractor.

FIG. 11 illustrates one embodiment of a microextractor 1100. Microextractor 1100 provides three inputs and one output. Polycarbonate (PC) was chosen as the material for the initial embodiment since the material is readily available, easy to machine and compatible with solvents necessary for microreaction. Several microextractors have been produced in polycarbonate by various methods. One approach to microchannel fabrication has been simply planing the microchannel with a single point tool. This has worked well for a single microchannel but is difficult for producing the cruciform design in FIG. 11.

An alternative approach has been to produce the cruciform design via polymer micro hot embossing. The embossing process uses a vacuum hot press to pattern micro-features in a 750 µm thick polycarbonate film. Raised macro features and indented micro features have been formed side-by-side with fidelity of +/−3 µm. Ni-electroformed tools have been developed on stainless steel substrates to be used as embossing tools. The capability to fabricate 3.8 cm×6 cm electroformed embossing tools with feature sizes down to 50 µm wide has been developed. The raised micro features are produced by electrodeposition of Ni onto rigid stainless steel substrates that are patterned photolithographically. The process is capable of thickness uniformity of +/−9% of the average feature height across the full tool substrate.

To avoid pitting during the electroforming process, the stainless steel substrate was constantly stroked with large air bubbles created by a plastic tube bubbler in the electroforming solution. The beaker which contains electroforming solution was placed in an ultrasonicator. Every 9 minutes, it was subjected to ultrasonic vibration for 1 minute until the electroforming process was done.

The height of the electroformed structures was ~50 µm. This is very close to the height of the SU8 mold so that V-shaped irregularities that occurred were minimized to only 1~2 µm. Such irregularities were further reduced to <1 µm after ashing the SU8 mold.

Figure 12A:
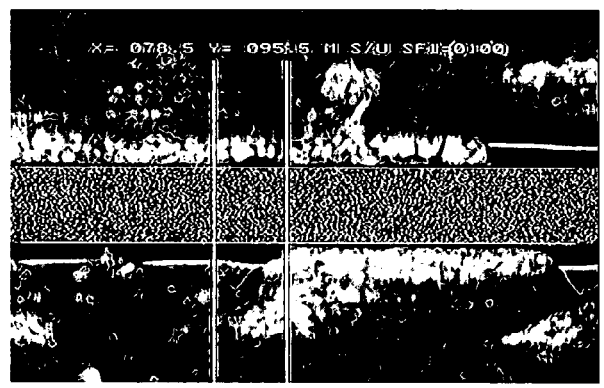
FIGS. 12A-13B are photomicrographs of a microextractor.
Figure 12B:
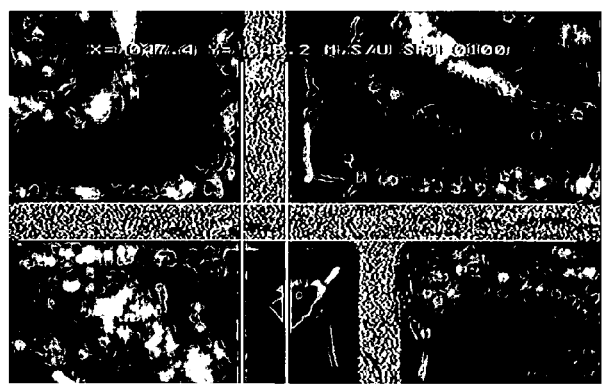
Figure 13A:
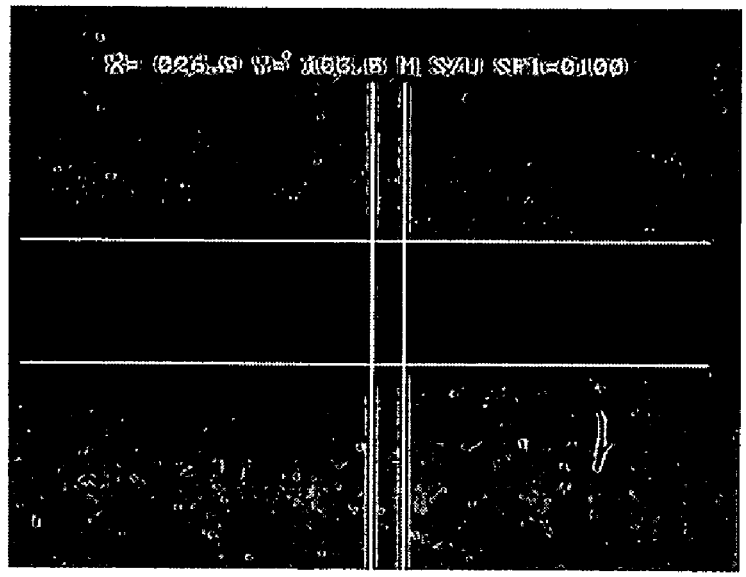
Figure 13B:

All in all, the electroforming technique was adjusted to yield optimized structures (see FIG. 12). The structure was then embossed onto polycarbonate substrate and mirror image of the structure was created (see FIGS. 13A and 13B). This can be used as a building block for making other micro mixing and extracting devices.

V. Valves

Figure 14A:
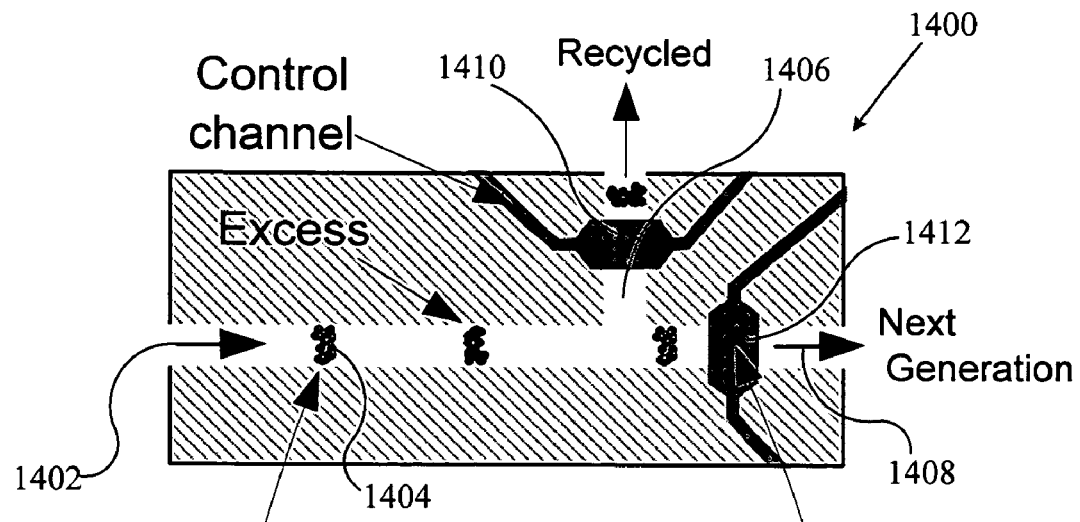
FIG. 14A is a schematic plan view of an integrated pneumatic valve from Thorsen, et al. (Thorsen, T., S. J. Maerkl and S. R. Quake. 2002. "Microfluidic Large-Scale Integration," *Science*, 298: pp 580-84) showing the ability to extract lower generation dendrons that were not consumed in a prior reaction (excess) from higher generation dendrons.
Figure 14B:
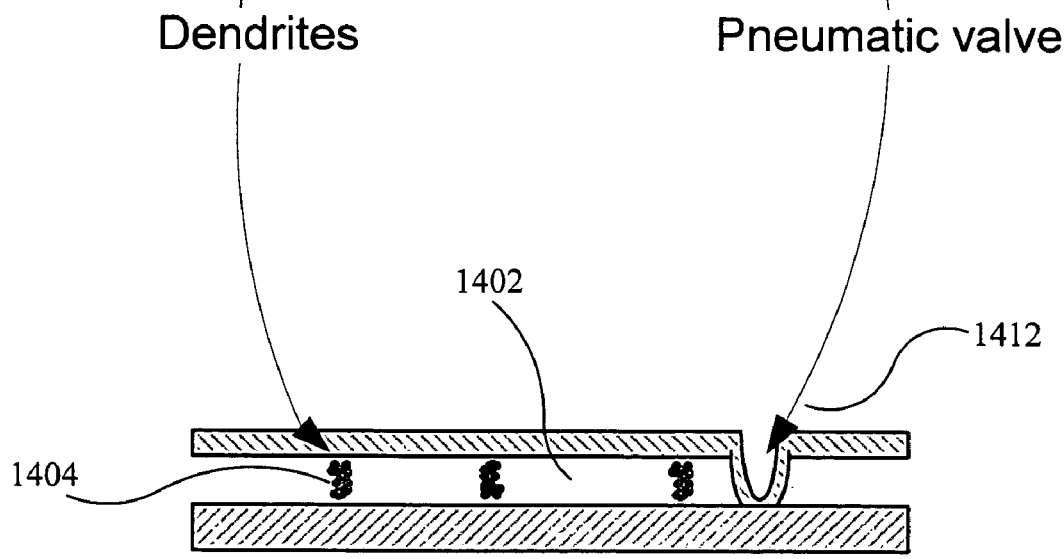
FIG. 14B is a schematic cross sectional view down the channel of the integrated pneumatic valve illustrated in FIG. 14A.

The need for valves in an integrated system soon becomes apparent. Some actuatable microvalves are known. For example, a pneumatically actuated valve conceived by Thorsen et al. is illustrated in FIGS. 14A and 14B. FIG. 14A is a plan view illustrating a system 1400 for production of dendrites. System 1400 includes a first channel 1402 through which dendrites 1404 flow. Recyclable material needs to be separated from material used to make the next dendrite generation. The recyclable material is guided down channel 1406 and next generation material is guided down channel 1408. System 1400 includes two pneumatically actuatable valves 1410 and 1412. A person of ordinary skill in the art will appreciate that similar valves can be integrated into the systems of the present invention, and further that the valves can be generally fluidly actuatable, need not solely be pneumatically actuatable, and can be, for example, hydraulically actuatable. By appropriate actuation of valves 1410 and 1412, recyclable material can be guided down channel 1406 and next generation material can be guided down channel 1408, as desired.

FIG. 14B is a cross sectional view of the system 1400 illustrated in FIG. 14A. FIG. 14B illustrates deflection of the valve 1412 into and blocking channel 1402.

FIGS. 15A and 15B illustrate an ultrasonic method for making a fluidly actuatable valve in a system 1500. FIG. 15A illustrates packaging an elastomeric valve membrane 1502, such as a polydimethylsiloxane (PDMS) elastomer, between two polycarbonate layers 1504, 1506 using ultrasonic welding. In order to accomplish this, angled channels are CNC machined into a stainless steel substrate after Ni electroforming and resist stripping. These yield raised ridges 1508, 1510 during embossing that act as energy directors for ultrasonic welding.

The elastomer valve membrane layer 1502 was patterned by spin casting PDMS monomer onto a wafer with raised photoresist features that produce the valve chambers, curing, and then laser machining openings for protrusion of the ultrasonic energy directors. FIGS. 15A and 15B are schematic cross sections prior to and subsequent to ultrasonically welding, respectively, with energy directors 1508, 1510 protruding above elastomeric valve layer 1502. FIG. 15B diagrams the result of ultrasonic welding with the energy directors 1508, 1510, melted down and bonding the top and bottom polycarbonate layers 1504, 1506 and compressing the PDMS layer 1502 and sealing the microchannels 1512 and 1514.

Figure 16:
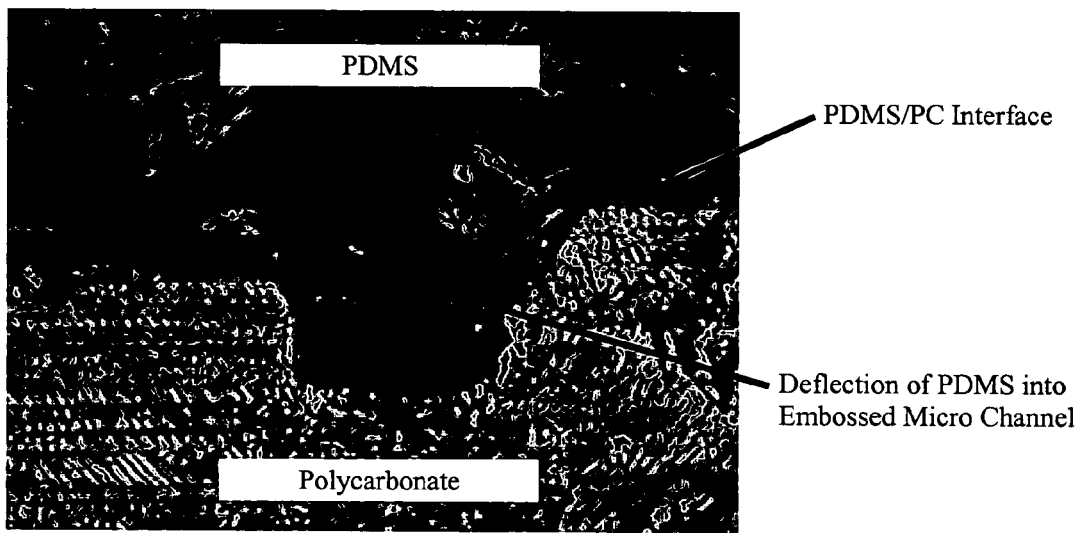
FIG. 16 is a photomicrograph illustrating in cross section a polydimethylsiloxane layer used to implement a valve adjacent a microchannel patterned into a polycarbonate layer.

With appropriate welding time and pressure the energy directors produce strong bonds and the PDMS compresses to create a conformal seal against the polycarbonate top and bottom as shown in FIG. 16.

Figure 17:
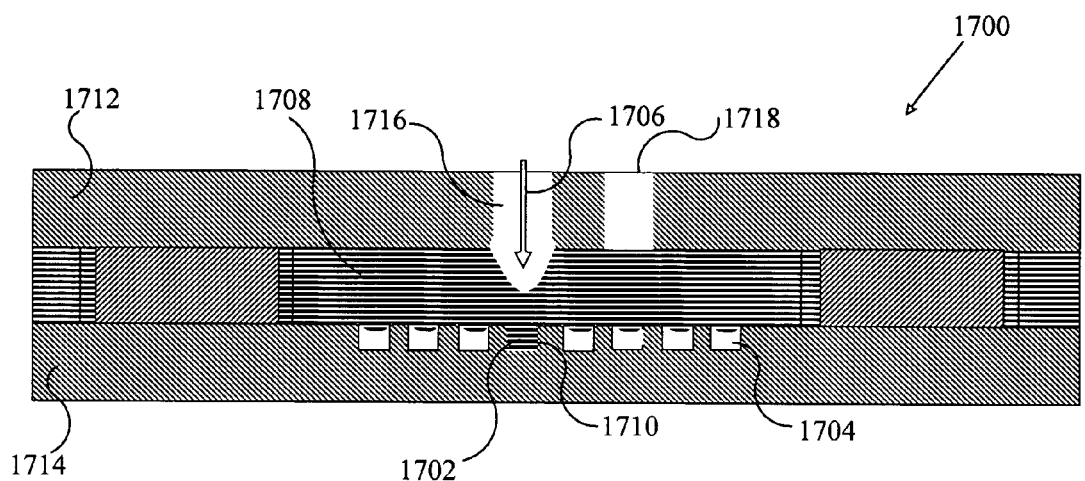
FIG. 17 is a schematic drawing illustrating elastomeric membrane valves in an actuated and unactuated state.

FIG. 17 illustrates a valve system 1700 comprising actuated valve 1702 and unactuated valves 1704. An actuation force, illustrated by arrow 1706, such as might be induced either pneumatically or hydraulically, compresses elastomeric layer 1708, which then deflects into microchannel 1710. The high modulus of layers 1712, 1714 constrain the elastomer of layer 1708 and allow for high actuation forces with minimal bulk material. This leads to less dead space above and below the valves 1702, 1704. In the case of pneumatic actuation the air channels can be closer together due to the higher rigidity of the walls. Compression of the elastomeric layer may be dependent on the welding pressure and time at a set energy level.

Figure 18:
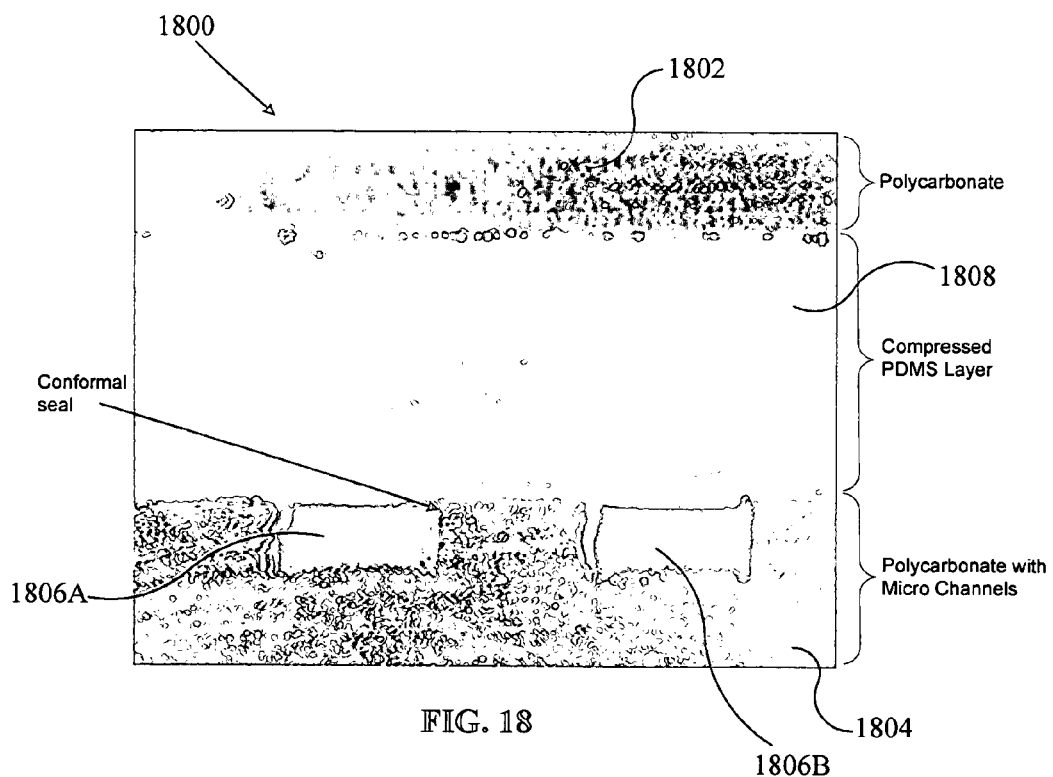
FIG. 18 is a photomicrograph of an array of microchannels in a valve system sealed by a compressed elastomeric layer.

FIG. 18 is a photomicrograph illustrating a working embodiment of a microvalve system 1800 comprising a first polycarbonate layer 1802 and a second polycarbonate layer 1804 having plural microchannels 1806 produced therein. An elastomeric layer 1808, produced from PDMS, is provided that allows sealing of the microchannels 1806A, 1806B upon selective actuation. Microchannels 1806A, 1806B had a cross section of 100 μm wide×50 μm deep, which were sealed by a 270 μm thick PDMS layer compressed 43 μm by ultrasonic welding.

VI. Separator

During any synthesis that includes iterative steps, or different, plural steps, reactants, reagents and products likely will have to be separated from one another in order to provide an effective synthesis device. A number of different separation techniques have been developed for use in an integrated system. For example, methods have been developed for using dendrimers as templates for porous monolithic sorbents. Fused silica capillaries have been used as molds for the monoliths. A second approach comprises casting monoliths in situ in microfluidic channels on chips. A third approach involves using electrodes positioned on either side of a microchannel that are used for di-electrophoretic separations.

A. Capillary Chromotagraphy

Capillary electrochromatography (CEC) is a rapidly growing area in analytical separations. Monolithic columns are perhaps the most attractive alternative to conventional packed columns for liquid chromatography (LC) and CEC. An in situ polymerization process can be performed directly within the confines of a mold, typically a segment of capillary tubing or a channel on a microchip. Both silica and organic-based monolithic columns are known. This procedure provides a sorbent for which frit formation and irreproducible packing are no longer issues.

The porosity of the polymeric stationary phase in monolithic columns is usually dictated by the nature and amount of the porogenic solvent employed. Aside from affecting porosity, adjustments of the amount and nature of the porogenic solvent(s), alter other properties such as the surface area, nature and swelling properties of the resulting monoliths.

Recently, Chirica & Remcho (Chirica, G. S., Remcho, V. T. *J Chromatogr. A* 2001, 924, 223-232, incorporated herein by reference) described a new synthetic method for preparing monoliths with porosity dictated by the size of spherical silica particle templates. In addition to tailoring the pore size, this method offers the ability to influence the surface characteristics of the finished polymer by employing silica beads with specific surface chemistry.

New monolithic stationary phases that afford control over porosity and, to a certain degree, over the surface chemistry of the sorbent have been considered. The novelty of this approach lies in the use of dendrimers for generating uniform pore structures. PAMAM dendrimers, unlike classical polymers, have a high degree of molecular uniformity, narrow molecular weight distribution, specific size and shape characteristics, and a highly-fimctionalized terminal surface.

B. Fused-Silica Tubing Capillaries

1. Chemicals and Materials

Butyl methacrylate (BMA), ethylene dimethacrylate (EDMA), 2-acrylamido-2-methyl-propansulfonic acid (AMPS), 2,2'-azobisisobutyronitrile (AIBN), Starburst (PAMAM) dendrimer (generation 4.5; 10% solution in methanol), and [(methacryloxy)-propyl] trimethoxysilane were purchased from Aldrich (Milwaukee, Wis, USA) and used as received. The solvents employed in the CE and CEC runs were HPLC grade and were purchased from Fisher Scientific (Pittsburgh, Pa., USA). Fused silica tubing of 100 μm I.D.×375 μm O.D. was purchased from Polymicro Technologies (Phoenix, Ariz, USA).

2. Production of Lysozyme Digest

Chicken egg lysozyme (Aldrich) was dissolved in 20 mM ammonium bicarbonate (pH 7.8) and digested using modified trypsin (Aldrich) (0.5 μg/mL) for approximately 72 hours at 37° C.

3. Instrumentation

Electrochromatographic experiments were carried out using an Agilent/HP$^{3D}$CE (Waldbronn, Germany) instrument, modified such that pressure of up to 12 bar can be applied on the inlet and/or outlet vials. Data acquisition and processing were performed with the Agilent ChemStation software. Samples were injected electrokinetically (5 kV for 3 sec). Pressure injection (50 mbar for 3 sec) was also used occasionally. The cassette temperature was set at 22° C.

Capillary columns during monolith preparation were examined with a simple Stereomaster optical microscope (Fisher Scientific, Houston, Tex. USA) with 40×magnification. The column morphology was studied using an AmRay (Bedford, Mass. USA) scanning electron microscope (SEM) operated at 10 kV.

4. Column Preparation a. Pretreatment of the Capillary

For columns in which the monolith was anchored to the fused-silica capillary wall, functionalization of the walls was required. The fused-silica tubing was derivatized with [(methacryloxy)-propyl] trimethoxysilane, using a method developed by Hjertén (Hjertén, S. *J Chromatogr*. 1985, 347, 191-195, incorporated herein by reference). Briefly, the capillary was flushed with a solution of sodium hydroxide (1 M) followed by water for at least 30 minutes each. The capillary was filled with a 4:1 (monomer/solvent; v/v) solution of [(methacryloxy)-propyl] trimethoxysilane and 6 mM acetic acid. The solution was kept in the capillary for at least 1 hour. The capillary was flushed with water for several minutes and finally emptied and dried with a flow of nitrogen.

b. Monolithic Column Preparation

AIBN (1 wt % with respect to the monomers) was dissolved in a monomer mixture consisting of 40% EDMA, 59.7% BMA and 0.3% AMPS. The solvent, methanol, was slowly admixed to the monomers in a 2:3 (v/v) ratio. Aliquots of 1 mL of this mixture were added to several vials containing specific amounts of Starburst (PAMAM) dendrimer. The dendrimer, commercially available as a 10% solution in methanol, was used after the removal of methanol by vacuum distillation. After addition of the monomer solution, the homogeneous mixtures were purged with nitrogen for 10 minutes. The capillary was filled with the polymerization mixture using a 100 μL syringe. Both ends of the capillary were sealed with rubber septa, and the column was submerged in a 60° C. bath for 20 hours. Using a syringe pump, the resulting monolith was washed with the mobile phase to flush out the residual reagents, dendrimers and methanol. With appropriate rinsing solutions, dendrimer templates can be recovered and reused.

Using a small piece of PTFE tubing the monolithic column was joined to a fused-silica open tube onto which a detection window was burned.

In addition, selected polymers were prepared in "bulk" quantities. These polymers were ground and then washed with the mobile phase to remove the dendrimers and any residual reagents. After drying, the porosity of the polymers was determined by mercury intrusion porosimetry.

C. Physical Characterization of the Monoliths

Figure 19A:
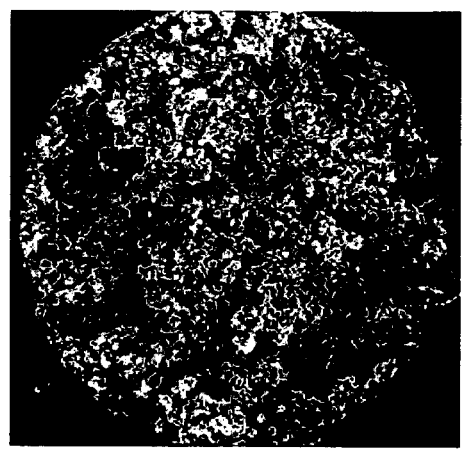
FIGS. 19A-19C are photomicrographs of monolithic columns prepared using different dendrimer concentrations.
Figure 19B:
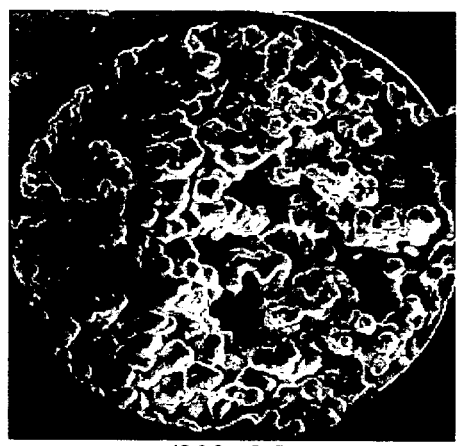
Figure 19C:
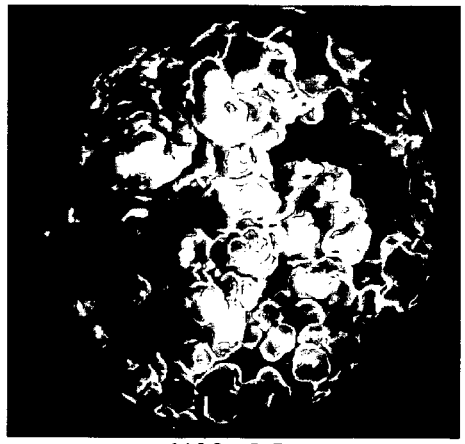

The monoliths that were not anchored to the capillary walls were extruded from the capillary and used for morphologic characterization of the monoliths. The polymer was sputter-coated with gold and examined with a scanning electron microscope. The SEM images presented in FIGS. 19A-19C demonstrated that this procedure renders a highly permeable monolith with porosity dictated by the dendrimer concentration.

The structures of the various monolithic columns differ significantly, and depend on the dendrimer concentration in the polymerization mixtures. At very high concentrations of dendrimer (such as 400 μM or greater), the microglobules become larger and the globule stacking and the channel distribution become less uniform. This is likely the causative factor behind the decrease in column efficiency and resolution achieved at the highest dendrimer concentrations studied.

The polymeric monoliths preferably are highly permeable for their application as sorbents in extractions and chromatographic separations. Different column porosities were obtained by varying the amount of the dendrimer template.

Porosity data and the pore size distribution profiles of the dried monoliths were obtained by mercury intrusion porosimetry. These analyses were performed by Micromeritics Instrument Corporation (Norcross, Ga.) using a Micromeritics AutoPore mercury porosimeter.

Figure 20:
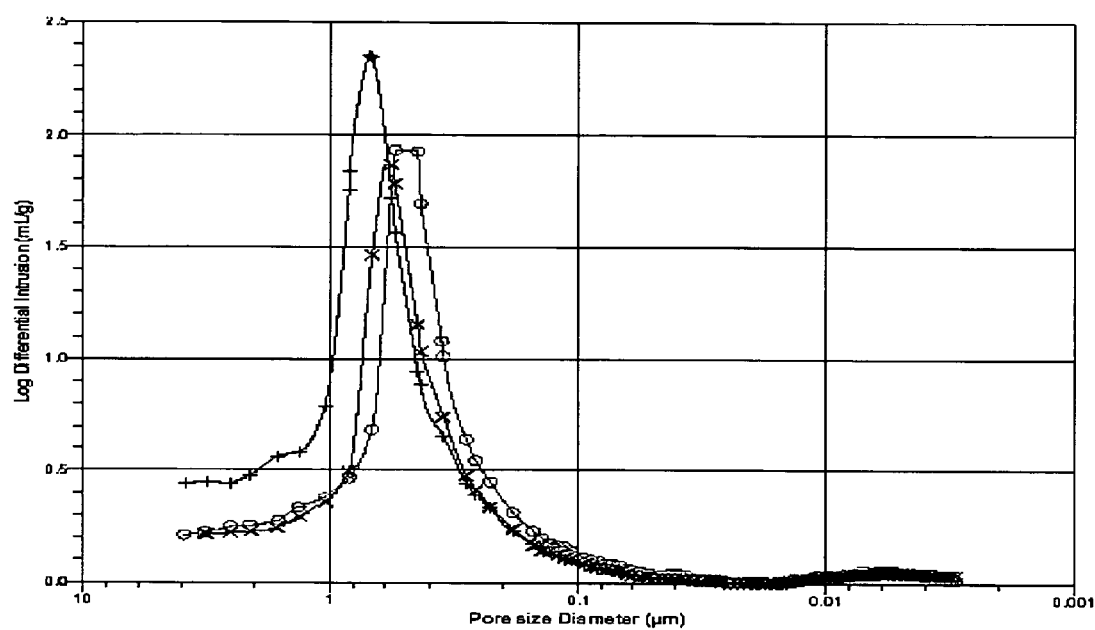
FIG. 20 is a graph of pore size diameter (μM) versus differential intrusion (mL/g) providing differential pore size distribution profiles of porous polymers prepared using dendrimers template concentrations of 0, 50 (×) and 100 (+)μM.

FIG. 20 shows the differential pore size distribution profiles for several porous polymers prepared using different dendrimer template concentrations. There is a noticeable difference between pore size distribution profiles for these columns. For instance, the mode pore diameter (the pore diameter at the maximum of the distribution curve) increases from 600 nm for column 1 (produced in the absence of dendrimers) to 700 nm for column 2 (50 μM dendrimers) and reaches 800 nm for column 3 (100 μM dendrimers). Based on these results, the average pore size of the monoliths can be adjusted as desired by selecting the dendrimer template concentration.

d. Chromatographic Characterization of the Monolithic Columns

The peak achievable efficiency of monolithic columns was examined in the CEC mode by measuring the peak width at half height for toluene in order to investigate the effect of dendrimer concentration on chromatographic performance.

Figure 21:
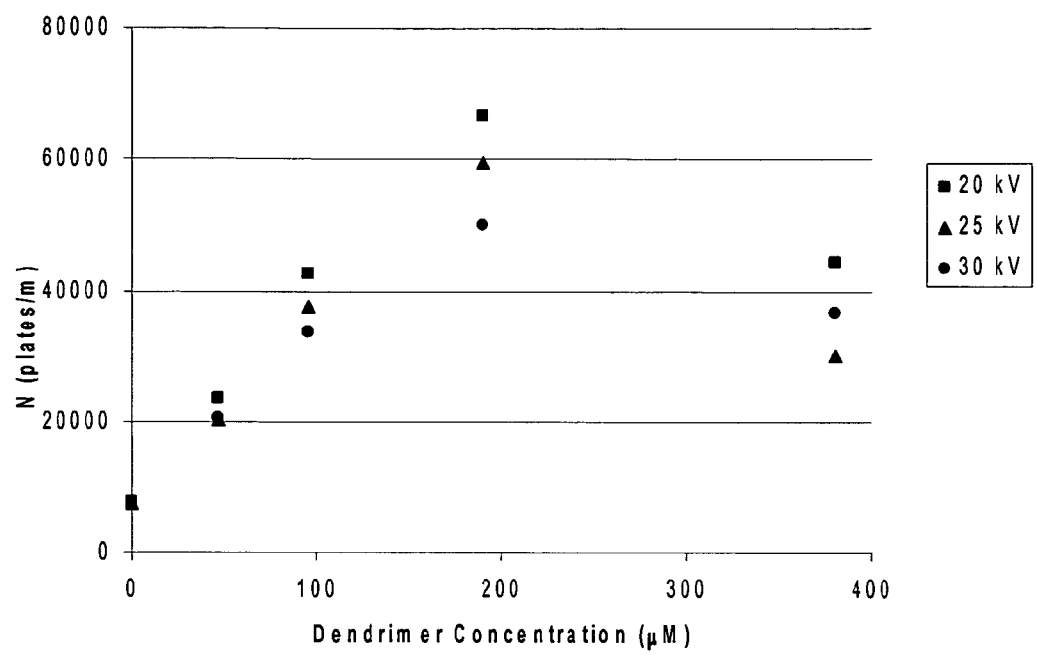
FIG. 21 is a plot of dendrimer concentration (μM) versus plates/m illustrating efficiency as a function of dendrimer template concentration for toluene [columns were prepared using EDMA 16%, total BMA and AMPS 24%, methanol 60%, AIBN 1 wt % (with respect to monomers); dendrimer template concentrations of 0, 50, 100, 200 and 400 μM; data were obtained by applying 20, 25 and 30 kV; the mobile phase was 80% acetonitrile: 20% phosphate buffer 5 mM (pH=7); and UV detection was used at 254 nm].

FIG. 21 shows a plot of efficiency as a function of dendrimer template concentration. As dendrimer concentration increases from 0 to 400 μM, the column efficiency increases from about 8,000 to 60,000 plates/m, reaching a maximum at 200 μM dendrimer concentration. As observed in the SEM data, at 400 μM dendrimer concentration, the pores become larger and less uniform, which is likely the cause of the decrease in column efficiency. The large size of the pores results in a smaller surface area and a larger total eluent volume; consequently the analyte is less retained and experiences greater diffusional relaxation, hence the lower efficiency.

Figure 22:
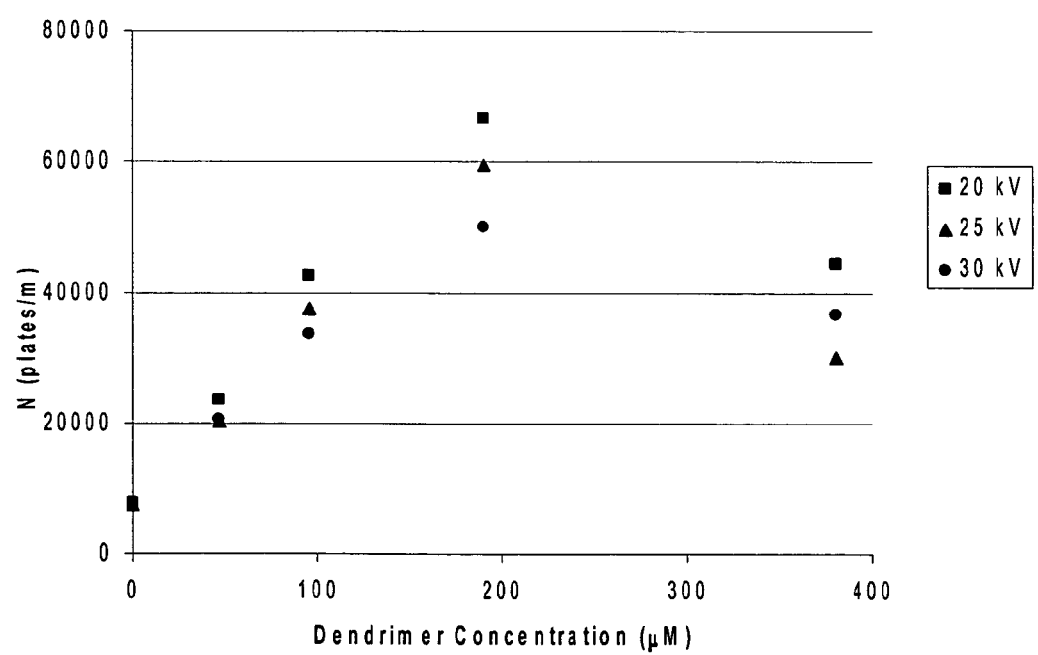
FIG. 22 is a plot of dendrimer concentration (μM) versus resolution (Rs) illustrating separation resolution of acetone and toluene with respect to dendrimer concentration (where conditions are the same as with FIG. 21).

Another parameter used to evaluate the chromatographic performance of these monolithic columns was resolution in the separation of acetone and toluene. As shown in FIG. 22 and as anticipated, the dendrimer concentration had a similar effect on chromatographic resolution as on efficiency. The resolution increases with the dendrimer concentration and reaches a maximum at 200 μM dendrimer concentration. Again, a decrease in column performance was observed at 400 μM dendrimer concentration.

Figure 23:
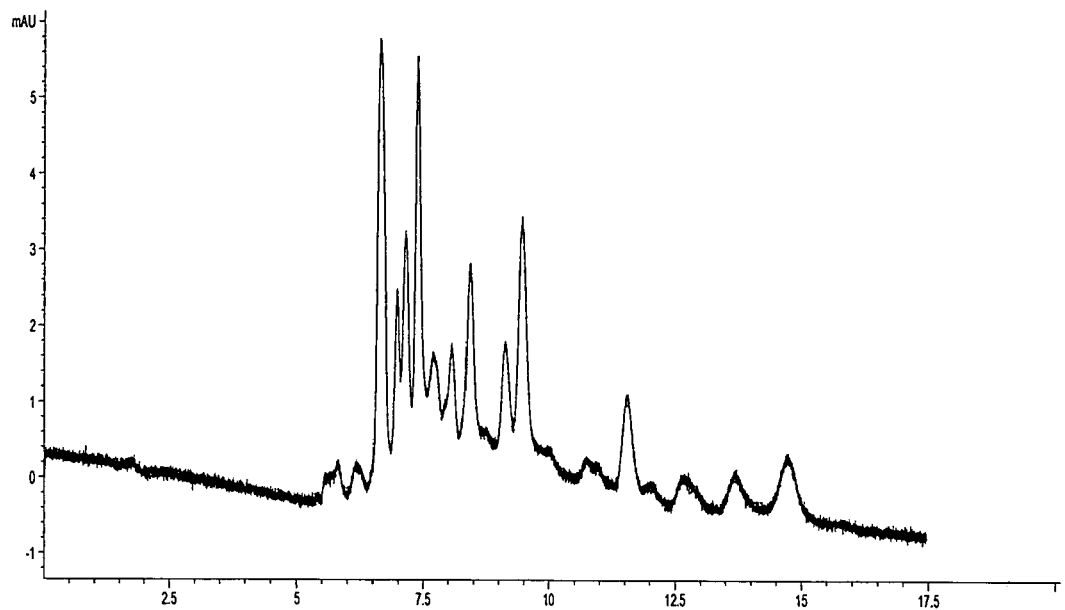
FIG. 23 illustrates a capillary electrokinetic chromatography CEC separation of lysozymte tryptic digest fragments [separation was performed on a 21 cm ($L_{bed}$); 31.5 cm ($L_{tot}$) column prepared using 50 μM dendrimer template; buffer was 40% acetonitrile/60% 40 mM phosphate buffer (pH=2); the applied voltage was 10 kV; and UV detection was used at 200 nm].
Figure 24:
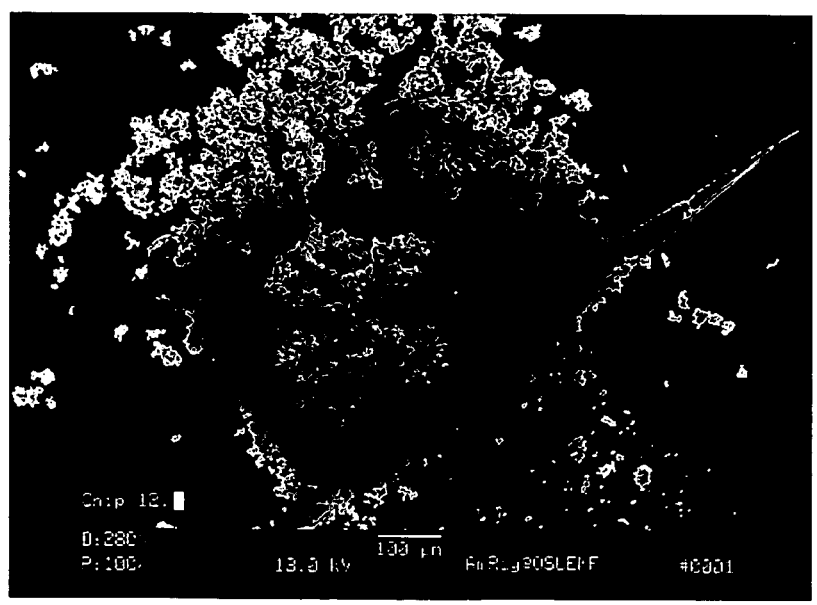
FIG. 24 is a photomicrograph of a channel cross section fractured in air.
Figure 25:
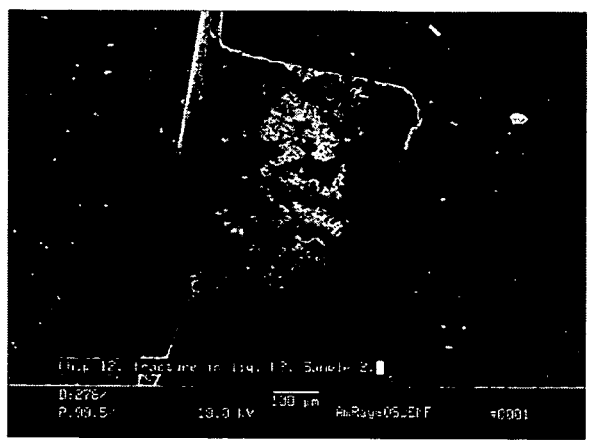
FIG. 25 is a photomicrograph of a channel cross section fractured in liquid nitrogen.

The performance of monolithic columns has mostly been evaluated using small, neutral organic molecules, which are typically separated under conditions of reverse-phase chromatography. To extend the range of monolithic column applications, the separation of lysozyme tryptic digest fragments was attempted on a column prepared using 50 μM dendrimer template. The chromatogram shown in FIG. 23, obtained using 40/60 ACN/40 mM phosphate buffer (pH=2) at an applied voltage of 10 kV, demonstrates the ability of these columns to separate complex mixtures.

5. Dendrimer-Templated Sorbents in Microfluidic Devices

Dendrimer-templated monoliths as described above are being immobilized in polycarbonate (PC) microfluidic chips. The chips are prepared by vacuum hot embossing a PC blank on a nickel-electroformed master, then sputtering the PC chip with silica in a commercial sputtering apparatus. The thin film of silica on the PC surface is then functionalized with an anchoring group and the dendrimer-templated monolith is cast as described above for fused silica capillaries.

Thus, a new class of porous polymer monoliths has been developed for use in a new format for capillary electrochromatography. The porosity of monoliths has been varied by adjusting the amount and nature of the porogenic solvent or by incomplete polymerization, although a macromolecular template PAMAM dendrimer is now an alternative method for pore generation. Structural attributes of this template allowed for production of continuous polymeric rods exhibiting uniform porosity.

As indicated above, organic-based columns also have been prepared. For purpose of rapid prototyping, a straight channel master was manufactured from a Teflon sheet using a CNC milling machine. Sylgard 184 PDMS prepolymer was mixed thoroughly in a 10:1 mass ratio of silicone elastomer to curing agent, degassed and poured onto the master. Chips were cured at 65° C. for 24 hours. After curing, the PDMS replica was peeled from the mold and holes were punched into the polymer to create access ports. Flat PDMS substrates were obtained by casting prepolymer mixture against a clean glass plate and curing. The two pieces of PDMS were placed in an oxygen plasma and oxidized for 1 minute. When joined together, the oxidized parts sealed irreversibly. Immediately after plasma oxidation and sealing of the upper and lower portions of the chip, the microchannel produced between the two layers was derivatized with [(methacryloxy)-propyl]trimethoxysilane. Following derivitization of the channel surfaces, monolithic porous polymers were prepared in situ on the microchip by photoinitiated polymerization.

The elasticity of the PDMS made it difficult to obtain a clean cut of the microchip and damaged the monolith. FIGS.

Figure 26:
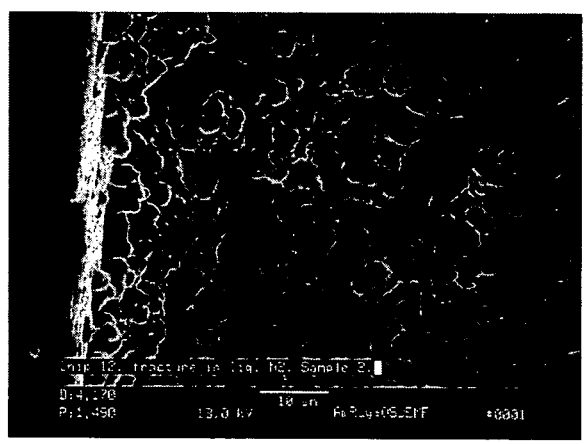
FIG. 26 is a photomicrograph of wall-anchored porous polymer monolith.
Figure 27:
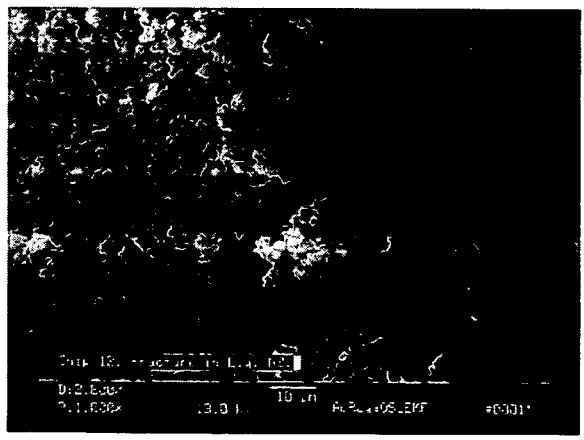
FIG. 27 is a photomicrograph of wall-anchored porous polymer monolith.

24 and 25 present the channel cross sections of a chip fractured at room temperature and after being frozen in liquid nitrogen, respectively. The monolith near the channel wall is adhered well to the wall surface. Aside from this, the SEM images presented in FIGS. 26 and 27 indicate a uniform structure of the monolith close to the walls, similar to that in the bulk material.

Figure 28:
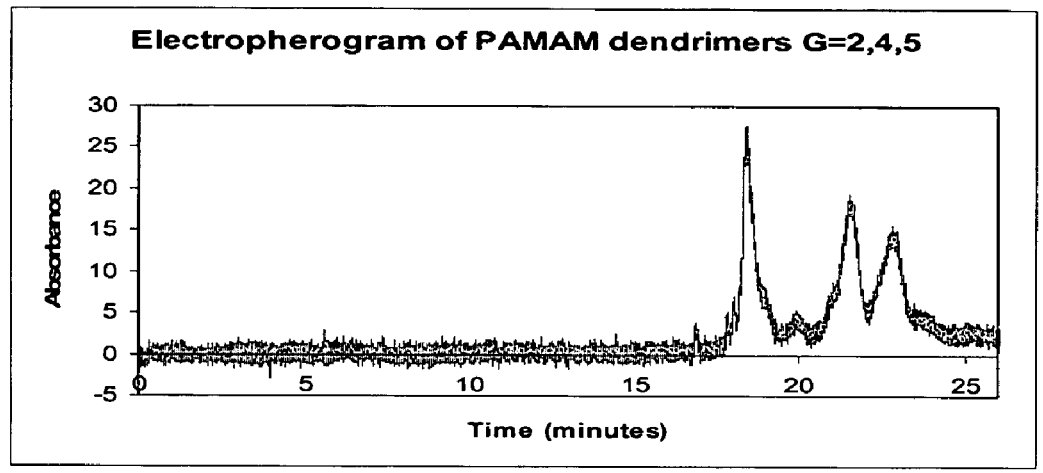
FIG. 28 is an electropherogram (plot of time versus absorbance) illustrating the separation of EDA-core PAMAM dendrimers (G=2,4 and 5) by capillary zone electrophoresis in phosphate buffer solution.
Figure 29:
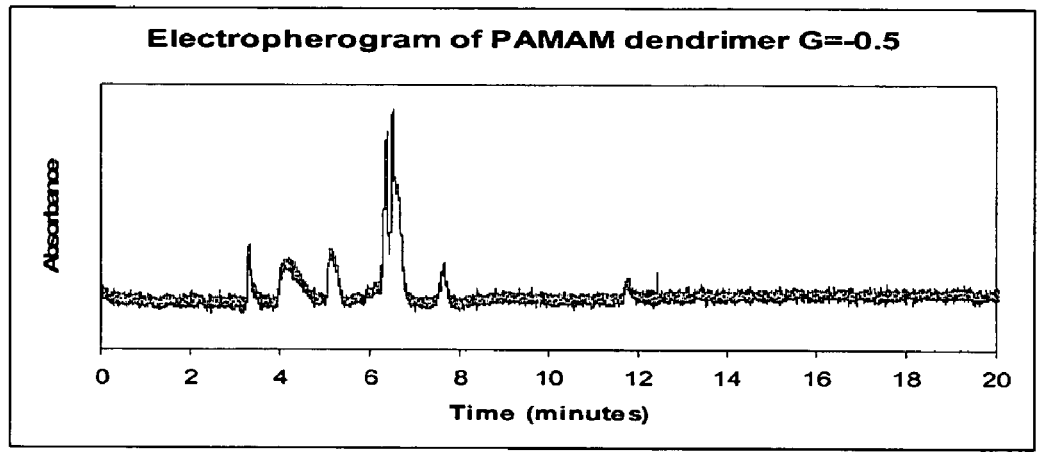
FIG. 29 is an electropherogram (plot of time versus absorbance) illustrating separations of microreactor-produced dendrimer generation 0.5 from several side products and residual reactants using dendrimer-templated, monolithic sorbents.

Capillary zone electrophoresis, CZE, utilizes the open, non-derivatized channels, such as those with an $SiO_2$ channel. The separation results typically obtained for dendrimer separations using CZE are shown in FIG. 28. A capillary electrochromatography, CEC, method (typical results shown in FIG. 29) are obtained using a porous monolithic polymer anchored to the $SiO_2$ walls and filling the channel. The CZE method are amenable to operating a microchemical nanofactory in a continuous mode, whereas the CEC method is likely best used in a pulsed or quasi-continuous mode.

With a CEC method the eluted dendrimer and precursors will be detected in-channel following separation using indirect laser-induced fluorescence. This method relies on an eluent solution matrix containing a uniform concentration of a background fluorophore. The eluate, the dendrimer or precursors, will cause a decrease in concentration of this background fluorophore resulting in a decrease of detected signal. This decrease in signal can provide quantitative analyis of concentration of the eluate or simply serve as a photogate for valve timing. With a CZE method the same detection method can be used.

VI. Chip-Based Detection

Figure 30:
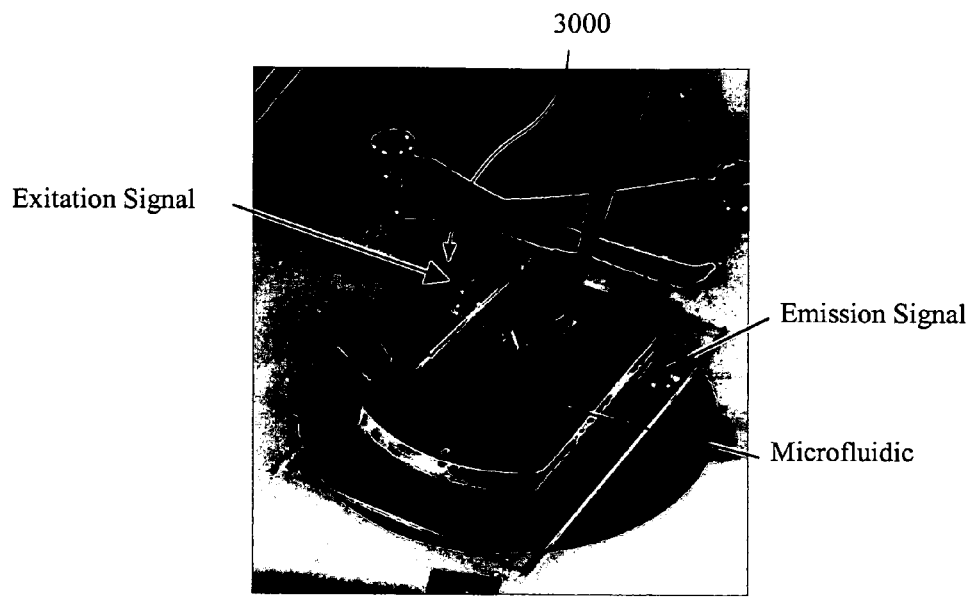
FIG. 30 illustrates a microfluidic chip incorporating an inverse fluorescence detector.

Reagents used for chemical synthesis, products, and by-products preferably will be detectable using a microchemical nanofactory that includes a detection system. FIG. 30 illustrates a micro-fluidic laser induced fluorescence detection chip 3000 that has been fabricated using a PDMStsubstrate. The laser dye Rhodamine B was detected using deteectin chip 3000 at $10^{-6}$ M concentration in methanol. The dye solution was injected manually into a 125 $\mu m^2$ fluidic channel. Optical fibers imbedded in the PDMS substrate were used to deliver the excitation light and to collect the emission light. A green laser pointer ($P_{out}$>5mW, $\lambda_{max}$=532 nm) served as the source of excitation light. A silicon PIN diode was used to detect the emission signal in conjunction with a lock-in amplifier.

Figure 31:
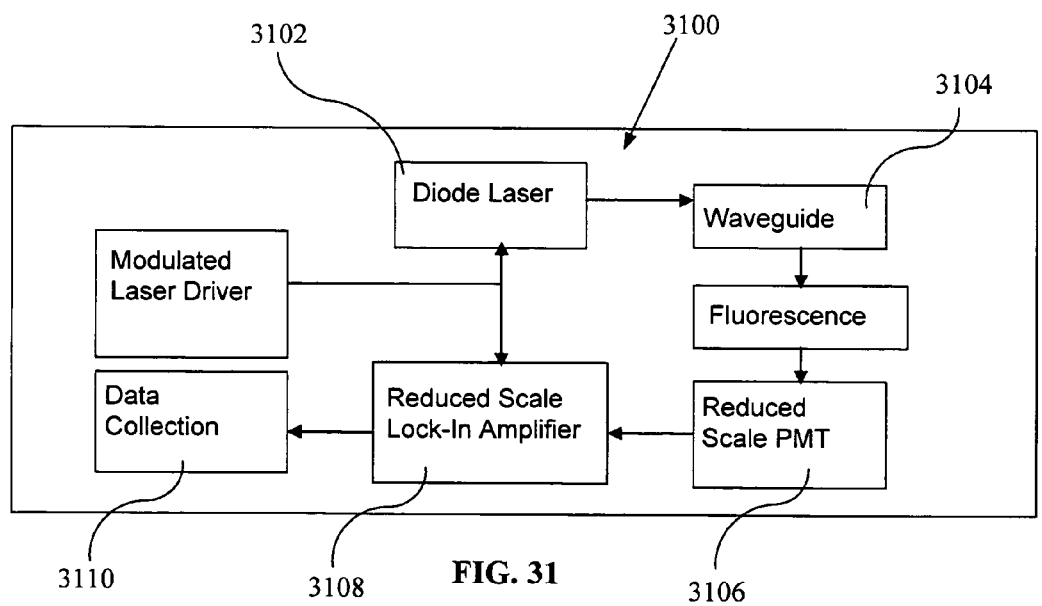
FIG. 31 is a block diagram illustrating one embodiment of a laser diode based detection system.

A second embodiment of a detection system 3100 is illustrated in the block diagram of FIG. 31. System 3100 includes a light source 3102, such as a laser, including diode lasers. Light source 3102 will be coupled with waveguide 3104, such as an SU-8 waveguide, at a position on an assembled chip. A light detector 3106, such as a photomultiplier tube, will be placed adjacent to the detection window in the microfluidic channel, and output from the light detector 3106 may be fed to an amplifier 3108. A data collection system 3110, either on chip or off, will be used to receive, store and evaluate data received from amplifier 3108.

VII Integrated Embodiments of microchemical Nanofactories

Figures 32A, 32B:
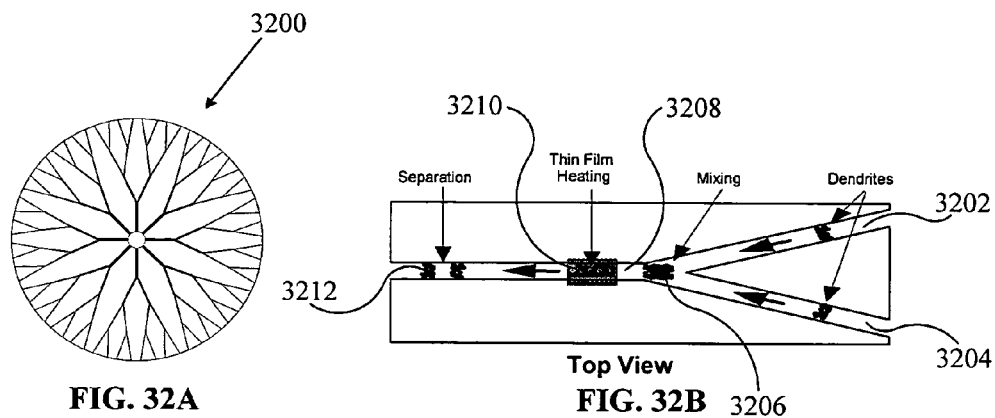
FIGS. 32A-32B are schematic diagrams illustrating one approach to fabricating a microchemical nanofactory, where

The large, fractal sequence of reactions necessary for convergent dendrimer production lends itself to the implementation of a fractal nanofactory, or "nanofractory". One embodiment of such a chemical synthesis factory 3200 is illustrated in FIGS. 32A-32B. The microchemical nanofactory mimics the geometry of the dendritic molecule it produces. Fractal microchannels have been proposed in heat transfer applications to lower pumping powers and improve thermal distribution on heat transfer surfaces. [See, for example, Chen, Y. and Cheng, P., "Heat transfer and pressure drop in fractal tree-like microchannel nets," International Journal of Heat and Mass Transfer, 45(13), Jun. 2002, pp 2643-2648; Pence, D. V., "Improved thermal efficiency and temperature uniformity using fractal-like branching channel networks," Proceedings of the International Conference on Heat Transfer and Transport Phenomena in Microscale, Banff, Canada, 2000, pp. 142-148; Wechsatol, W., Lorente, S., and Bejan, A., "Optimal tree-shaped networks for fluid flow in a disc-shaped body", Intl J Heat and Mass Transfer, 45(25): 4911-4924, 2002; and Pence, D. V., "Reduced pumping power and wall temperature in microchannel heat sinks with fractal-like branching channel networks," Microscale Therm Eng, 6(4): 319-330, 2002.] These benefits derive mainly from the minimization of microchannel flow path lengths and the continual disruption of hydrodynamic and thermal boundary layers caused by the regular bifuircation of the flow. The space efficiency of fractal networks is used to improve the channel and unit operation packing density, thereby making the illustrated device compact. Chamber dimensions are on the order of 50 to 100 μm, where dimensions are dictated largely by mixing times, flow rates, residence times, etc.

FIG. 32B, an exploded view of one microchannel of a portion of the fractal plate of FIG. 32A, schematically illustrates a microchemical nanofactory approach for synthesizing dendrimers. Dendrites flow in microchannels 3202 and 3204 towards a mixing section 3206. The mixed fluid stream then flows through channel 3208 to a heating section 3210 having a heater, such as a thin-film heater. Product, reagents and any byproducts must then be separated in a separation section 3212.

Figures 33A, 33B:
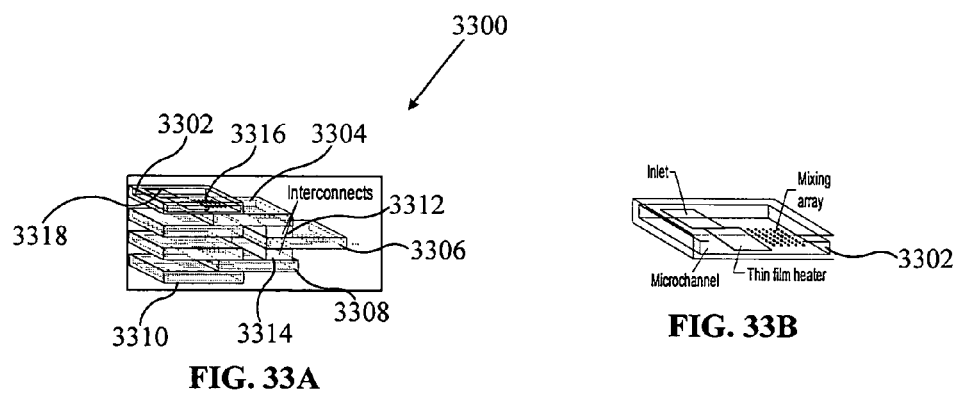
FIGS. 33A-33B are schematic diagrams illustrating a modular approach to making microchemical nanofactories where

FIGS. 33A-33B illustrate a modular approach for both divergent and convergent synthesis. Nanofactory 3300 includes plural layers, such as may be made by microlamination architecture, 3302, 3304, 3306, 3308 and 3310. Such layers are fluidly coupled by fluid interconnects, such as interconnects 3312 and 3314. Layer 3302 includes a mixing array 3316 and a heater 3318 FIG. 33B is an enlarged view of layer 3302 of device 3300. Layer 3302 includes a microjet mixing section 3316. Thin film heater 3318 (see, for example, Kovacs, G. "Micromachined transducers sourcebook," McGraw-Hill, 1998) and thermocouples (not shown) can be used to support dendrimer investigation and production. To make thin-film heaters, thin films will be evaporated onto substrates and integrated into microchannels using various bonding techniques.

Figure 34:
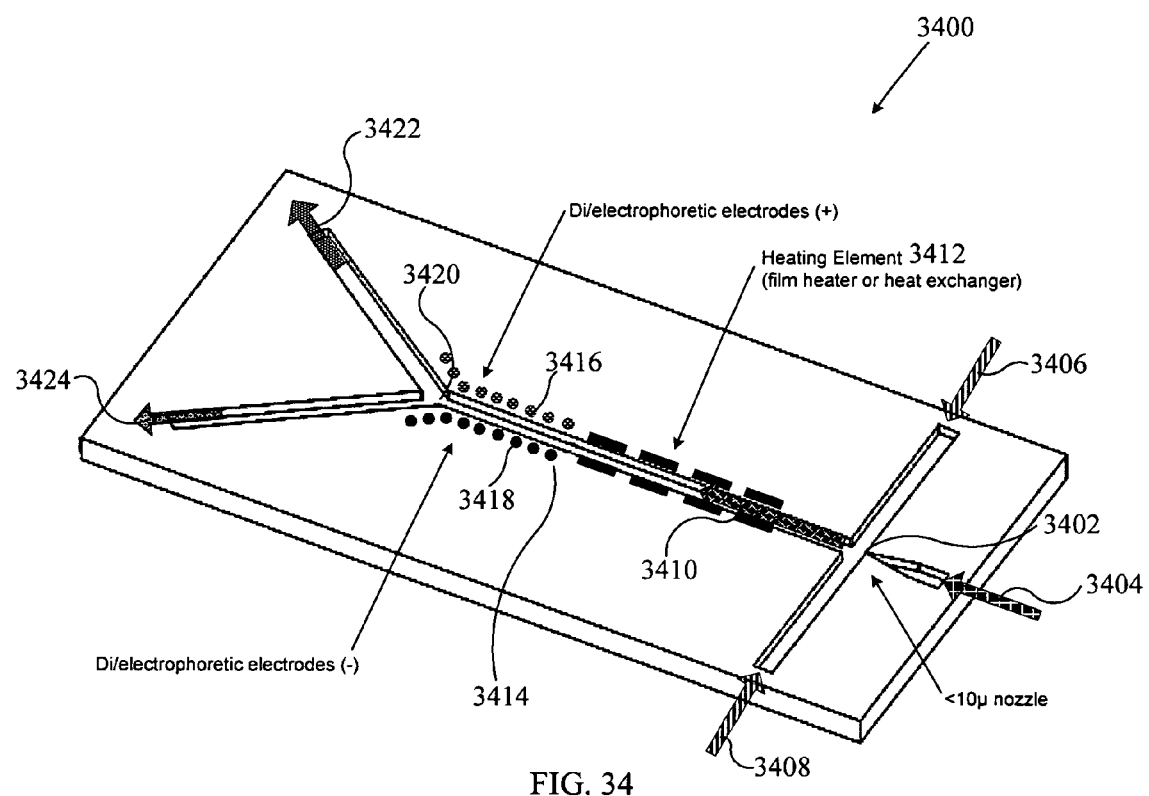
FIG. 34 is a perspective schematic view of one embodiment of an integrated microchemical nanofactory having an in-plane nozzle micromixer, heating element, and di-electrophoretic separation.

FIG. 34 shows another embodiment of an integrated device 3400 for synthesizing compounds according to the present invention that can be made by microlamination architecture. Although only a single layer is illustrated in FIG. 34, this single layer most likely would be composed of plural, individual laminae registered and bonded to define device 3400.

Device 3400 includes an in-plane nozzle mixer 3402 at a first end there of for introducing at least a first fluid (indicated by arrow 3404) and a second fluid (indicated as arrow 3406) into mixer 3402. A person of ordinary skill in the art will realize that more than two fluid streams can be mixed by mixer 3402, and hence third fluid stream 3408 may be the same as 3404 or 3406, or may be different therefrom, depending upon the compound being synthesized by device 3400. Nozzle mixer 3402 has an orifice of approximately 10 microns.

Once mixed, first fluid stream 3404 and second fluid stream 3406 form a combined fluid stream 3410. Depending upon the chemical synthesis being conducted, combined stream 3410 might involve an endothermic reaction or an exothermic reaction. In such situations, a heating element 3412 might be advantageously positioned downstream of mixer 3402. For example, and in an endothermic reaction, it might be beneficial to increase the fluid temperature rate by heating the fluid stream 3410 to either increase the reaction rate or to provide sufficient thermal energy to heat the reactants sufficiently to overcome any thermal barrier for forming the desired product. Alternatively, if the reaction is exothermic then heating element 3412 might instead be a cooling section, such as a heat exchanger.

As indicated above for the micromixer chemical synthesis of dendrimers, the reaction time can be substantially decreased when mixing occurs using micromixers. Thus, fluid residence time in the reaction portion of the integrated device can be relatively short, on the order of seconds or fractions of seconds. However, in the situation where the residence time might need to be increased so that complete reaction of mixed reagents occurs, fluid residence time can be increased using actuatable valves (not shown for device 3400). Alternatively, integrated devices according to the present invention may use continuous fluid flow, rather than plug flow, in the reaction portion of the device.

Device 3400 includes a separations section 3414 downstream from heat exchange section 3412. For example, where two or more products are formed during the reaction, such products may need to be separated. Alternatively, a product might need to be separated from reagents used to form the product. Thus, the illustrated integrated device 3400 includes separation section 3414. In the illustrated embodiment, the separation section 3414 is a dielectrophoretic separation section; hence integrated device 3400 includes electrodes 3416 of a first polarity and electrodes 3418 of an opposite polarity, with electrode and channel geometries appropriate to yield a non-uniform potential gradient. By creating a potential difference across the fluid channel 3420, materials differing in polarizability can be separated into at least the two illustrated different fluid streams 3422 and 3424. For example, fluid stream 3422 might comprise the desired product, whereas fluid stream 3424 might comprise a recycling stream or a waste stream for might be received for appropriate disposal, depending on the material found in such fluid stream.

Figure 35:
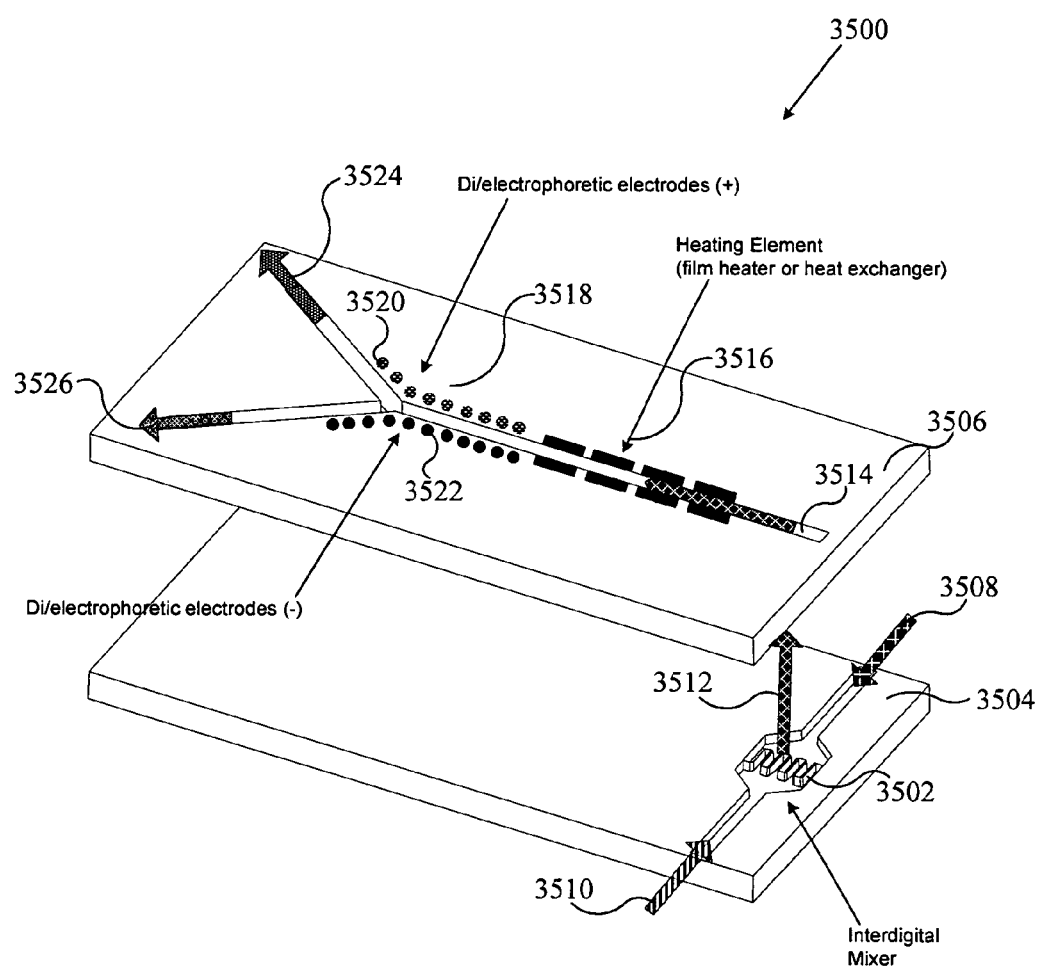
FIG. 35 is a perspective schematic view of one embodiment of an integrated microchemical nanofactory having an out-of-plane, interdigital mixer, heating element, and di-electrophoretic separation.

FIG. 35 shows still another embodiment of an integrated device 3500 comprising an out-of-plane, interdigital mixer 3502 with continuous separation of materials in fluid streams. FIG. 35 indicates that device 3500 has two layers 3504, 3506, that together define an integrated device. However, as with the embodiment illustrated in FIG. 34, layers 3504 and 3506 most likely would be made using individual lamina that are assembled by the microlamination architecture methodology described herein. First layer 3504 includes interdigital mixer 3502 at a first end thereof. A first fluid stream 3508 and a second fluid stream 3510 flow to the interdigital mixer 3502, thereby creating a third product fluid stream 3512. Fluid stream 3512 then flows perpendicularly to the flow direction of first fluid stream 3508 and the second fluid stream 3510, and into microchannel 3514 defined by layer 3506.

Device 3500 may include a heating element 3416 positioned downstream of mixer 3502. For example, and in an endothermic reaction, it might be beneficial to increase the fluid temperature rate by heating the fluid stream 3512 to either increase the reaction rate or to provide sufficient thermal energy to heat the reactants sufficiently to be over thermal barrier required for the desired reaction to proceed. Alternatively, if the reaction is exothermic then heating element 3516 might instead comprise a cooling section.

Device 3500 includes a separations section 3518 downstream from heat exchange section 3516. For example, where two or more products are formed during the reaction, such products may need to be separated. Alternatively, a product might need to be separated from reagents used to form the product. Thus, the illustrated integrated device 3500 includes separation section 3518. In the illustrated embodiment, the separation section 3518 is a dielectrophoretic separation section; hence integrated device 3500 includes electrodes 3520 of a first polarity and electrodes 3522 of an opposite polarity, with geometry an dconfiguration appropriate to yield a non-uniform potential gradient across the channel. By creating a potential difference across the fluid channel 3514, materials of different polarizability can be separated into at least the two illustrated different fluid streams 3524 and 3526. For example, fluid stream 3524 might comprise the desired product, whereas fluid stream 3526 might comprise a recycling stream or a waste stream for might be received for appropriate disposal, depending on the material found in such fluid stream.

Figure 36:
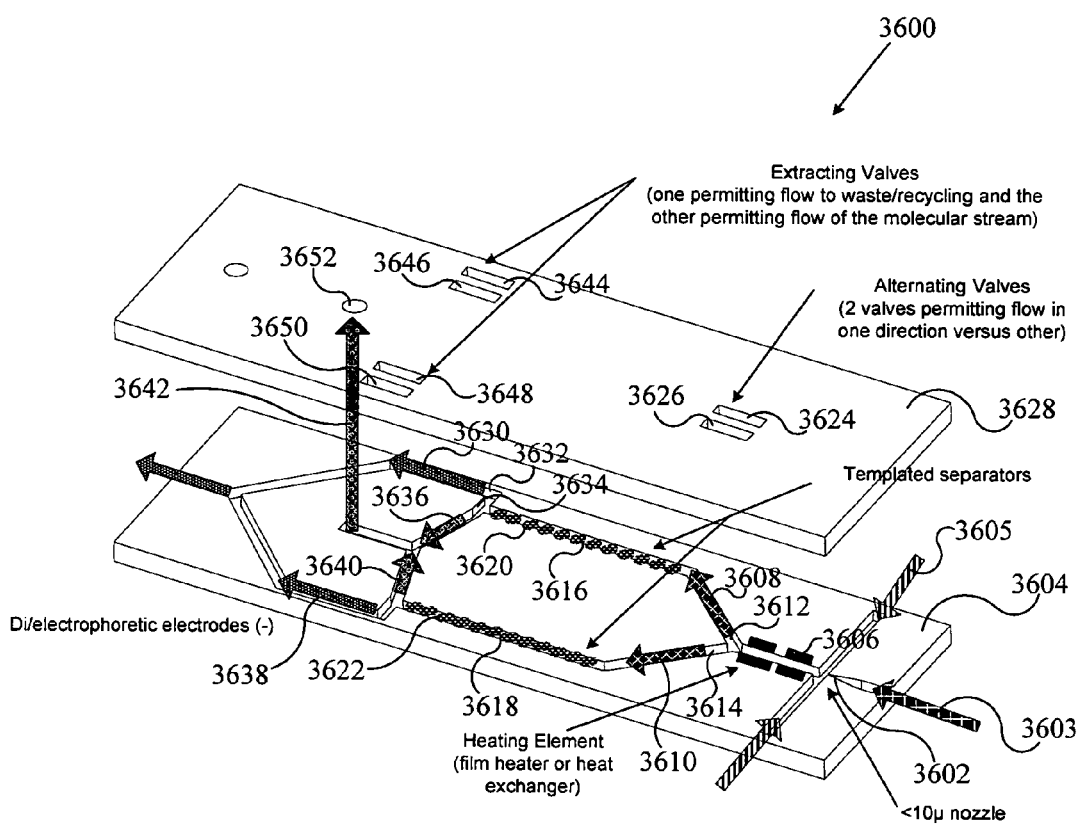
FIG. 36 is a perspective schematic view of one embodiment of an integrated microchemical nanofactory having an in-plane nozzle micromixer, heating element, and plug flow templated separation.

FIG. 36 shows still another embodiment of an integrated microchemical nanofactory 3600. FIG. 36 illustrates in-plane nozzle mixer 3602. As with the prior embodiments, the illustrated embodiments can be made by microlamination architecture using various materials such as stainless steel, polymers, such as polycarbonate, and elastomeric materials, such as polydimethylsiloxane. These materials will be assembled as lamina to provide an overall architecture that, when assembled and registered, as described herein, defines integrated device 3600

Illustrated device 3600 again includes a nozzle mixer 3602 on a first layer 3604. A first fluid feed stream 3603 and a second fluid stream 3605 are mixed using mixer 3602. Additional fluid streams also can be mixed using mixer 3602.

Downstream of mixer 3602, device 3600 includes a heating element 3606, as with the embodiments described above. Downstream of heating element 3606, plural mixed fluid streams 3608 and 3610 exit the heating element 3606 and flow to fluid microchannels 3612, 3614, having separation sections 3616, 3618, respectively. It will be understood by a person of ordinary skill in the art that the number of fluid channels exiting the heating element portion 3606 is not limited to the two fluid channels 3612, 3614 illustrated in FIG. 36. One reason for having plural fluid flows in the illustrated embodiment 3600 is that the separation technique can be different from the substantially continuous dielectrophoretic techniques indicated in previous embodiments. For example, in the separation section of this application templated separators were described that were made, for example, from polymeric materials having pores that were introduced for separation of specific materials one from another. Thus, device 3600 may include a first templated separator 3620 and a second templated separator 3622. Furthermore, separator 3620 might have the same structure as separator 3622, and hence operate identically for purposes of separating materials, or separator 3620 and separator 3622 might be designed to have different sorbents for performing different separations.

Templated- and non-templated sorbent-based separation techniques may function best for non-continuous flow methods, as opposed to continuous flow. For continuous flow through a separation channel having a templated or non-templated separation embodiment, a first fluid portion entering the separation channel would overlap with a second fluid portion entering the fluid channel. This would eradicate any separation that may have occurred by flowing the first fluid portion into the separator.

To guide various batch portions of the mixed fluid stream into the separators 3620, 3622, actuatable valves 3624, 3626 are included in layer 3628. Batch flow through the separation portions 3616, 3618 can be facilitated by effectively actuating valves 3624, 3626 at an appropriate time.

Following the separation sections 3616, 3618, a fluid stream 3630 comprising the desired material is guided down a first fluid channel 3632. A second fluid channel 3634 is provided for a fluid stream 3636 comprising, for example, either recyclable material or waste material that has been separated from the desired material. Because there are plural (two in the illustrated embodiment) separation portions 3616, 3618, the separated fluids from separator 3622 also are bifurcated into a stream 3638 comprising the desired material and a fluid stream 3640 comprising waste or recyclable material. Fluid streams 3636 and 3640 then may combine to form a single waste or recyclable fluid stream 3642, and fluid streams 3630 and 3638 also may combine to form a single product stream.

In order to guide fluid streams to the appropriate fluid channel, device 3600 may include actuatable valves 3644, 3646, 3648 and 3650. A pair of valves selected from valves 3644, 3646, 3648 and 3650 permit fluid flow to the waste or recycling fluid channel, which leads to an outlet pore 3652. The other pair of extraction valve permits flow of the desired fluid stream either to an outlet pore to deliver the desired synthesized compound, or alternatively to a further reaction portion of the integrated microchemical nanofactory 3600 to continue performing additional reactions on the product from the first portion of the device.

Figure 37:
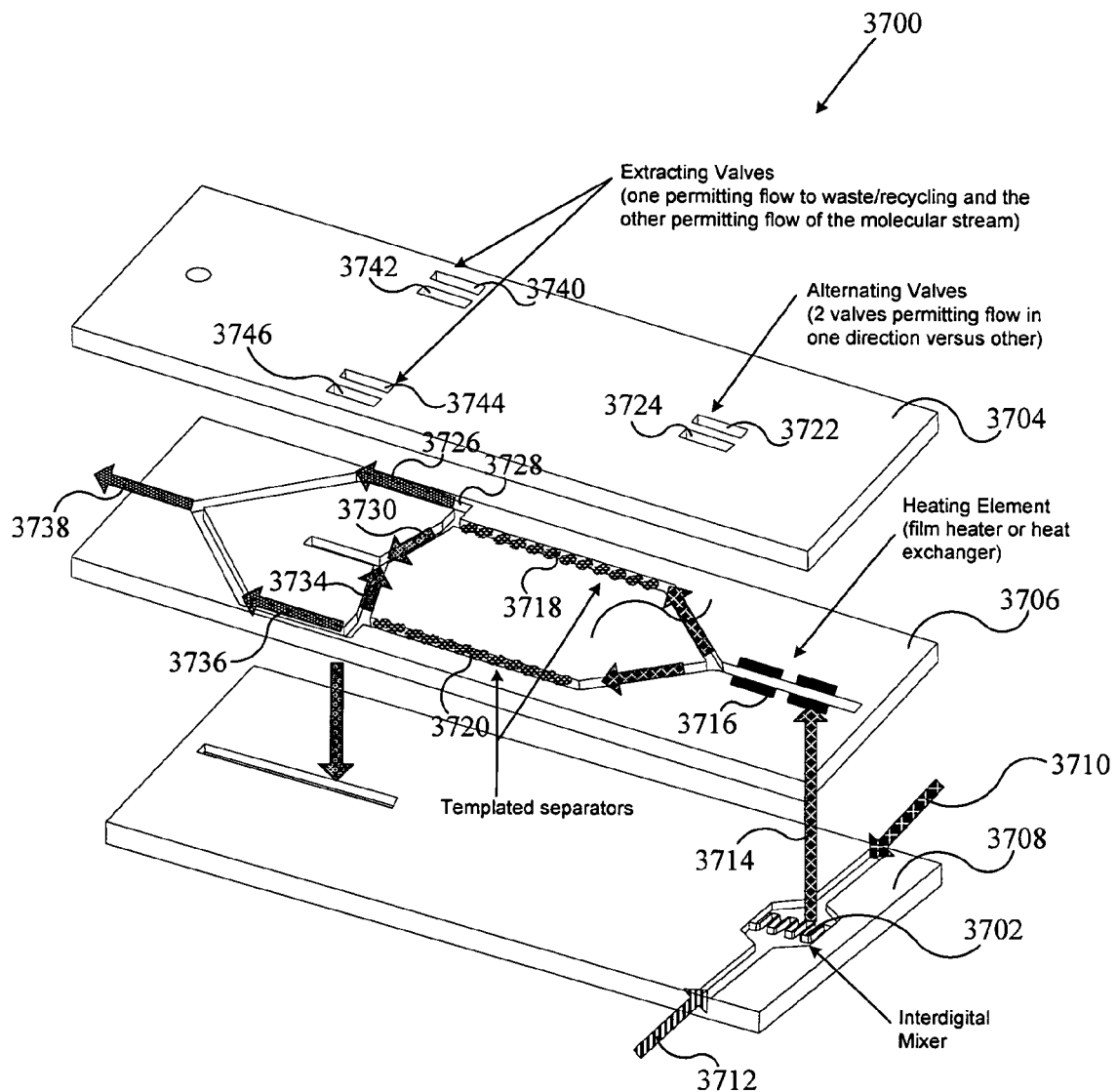
FIG. 37 is a perspective schematic view of one embodiment of an integrated microchemical nanofactory having an out-of-plane, interdigital mixer, heating element, and plug flow templated separation.

Still another embodiment of an integrated device 3700 is illustrated in FIG. 37. Device 3700 includes an out-of-plane, interdigital mixer 3702. Device 3700 comprises three layers, 3704, 3706 and 3708. A first fluid stream 3710 and a second fluid stream 3712 flow into interdigital mixer 3702 to produce a third fluid stream 3714 that flows perpendicular to the flow of the first stream 3710 and the second stream 3712. The mixed fluid flow stream 3714 then flows into second layer 3706 comprising a heating element 3716.

Separators 3718 and 3720 are provided downstream from the heating element 3716. To guide various batch portions of mixed fluid stream 3714 into the separators 3718, 3720, actuatable valves 3722, 3724 are included in layer 3704. Batch flow through the separators 3718, 3720 can be facilitated by effectively actuating valves 3722, 3724 at an appropriate time.

Following the separators 3718, 3720, a fluid stream 3726 comprising the desired material is guided down a first fluid channel 3728. A second fluid channel 3730 is provided for a fluid stream 3732 comprising, for example, either recyclable material or waste material that has been separated from the desired fluid material. Because there are plural (two in the illustrated embodiment) separators 3718, 3720, the separated fluids from separator 3720 also are bifurcated into a stream 3736 comprising the desired material, and a fluid stream 3734 comprising waste or recyclable material. Fluid streams 3726 and 3736 then combine to form a single fluid stream 3738.

In order to guide fluid streams to the appropriate fluid channel, device 3700 may include actuatable valves 3740, 3742, 3744 and 3746. A pair of valves selected from valves 3740, 3742, 3744 and 3746 permit fluid flow to the waste or recycling fluid channel, which leads to an outlet. The other pair of extraction valve permits flow of the desired fluid stream either to an outlet pore to deliver the desired synthesized compound, or alternatively to a further reaction portion of the integrated microchemical nanofactory 3700 to continue performing additional reactions on the product from the first portion of the device.

The present invention has been described with reference to certain exemplary embodiments. The present invention should not be limited to these disclosed embodiments, but rather should be accorded the scope understood by a person of ordinary skill in the art in view of the disclosure and the following claims.

We claim:

1. An apparatus for chemical synthesis and/or analysis, comprising:
   a laminated, microfluidic structure defining branched microchannels having at least a first fluid inlet branching into a first and a second fluid microchannel with the first fluid microchannel further branching into at least a third and a fourth fluid microchannel and the second fluid microchannel branching into at least a fifth and a sixth fluid microchannel;
   at least one mixer fluidly associated with the branched microchannels; and
   at least one membrane separator fluidly associated with the branched microchannels.

2. The apparatus according to claim 1 further comprising a temperature control section.

3. The apparatus according to claim 2 where the temperature control section is a heater.

4. The apparatus according to claim 1 further comprising at least two of a heating system, a cooling system, one or more valves, and a detector.

5. The apparatus according to claim 1 wherein the at least one mixer is an interdigital mixer.

6. The apparatus according to claim 5 where the interdigital mixer includes plural channels having a width of about 50 μm or less and a length of about 250 μm or less.

7. The device according to claim 1 further comprising at least one valve.

8. The device according to claim 7 where the at least one valve is a fluidly actuatable valve comprising a fluidly deflectable elastomeric layer.

9. The apparatus according to claim 1 having plural, selectively actuatable valves.

10. The apparatus according to claim 1 further comprising at least one additional separator selected from a dielectrophoretic separator, an electrophoretic separator, a templated, sorbent-based separator, a non-templated separator, a capillary electrochromatographic separator, a capillary zone electrophoretic separator, or combinations thereof.

11. The apparatus according to claim 10 where the at least one additional separator is a dendrimer templated separator.

12. The apparatus according to claim 1 made from a material selected from metals, intermetallics, alloys, polymeric materials, ceramics, or combinations thereof.

13. The apparatus according to claim 12 where the metal or alloy is stainless steel, carbon steel, phosphor bronze, copper, graphite, aluminum, or combinations thereof.

14. The apparatus according to claim 12 where the polymeric material is a polydialkylsiloxane, a polycarbonate, a polysulfone, a polyimide, or combinations thereof.

15. The apparatus according to claim 1 having microchannel dimensions that range from about 1 micrometer to about 100 micrometers.

16. The apparatus according to claim 1 made using microlamination architecture where laminae used for microlamination have thicknesses of from about 1 mil to about 32 mils.

17. The apparatus according to claim 1 further comprising an optical detector.

18. A monolithic microchemical nanofactory for iterative polymerization, comprising:

at least a first fluid microchannel inlet and a second fluid microchannel inlet for feeding a first reagent and a second reagent to a first mixer which forms a first product stream comprising a first product;

a third fluid microchannel inlet for receiving a third reagent;

a second mixer for receiving the third reagent and the first product to form a second product stream comprising a second product; and at least one separator for separating the first product, the second product, and/or another product from a product stream.

19. The microchemical nanofactory according to claim 18 where at least one mixer is a nozzle mixer.

20. The microchemical nanofactory according to claim 19 where the nozzle mixer has a nozzle opening of from about 1 μm to about 10 μm and an aspect ratio of 30:1 or greater.

21. The microchemical nanofactory according to claim 18 where at least one mixer is an interdigital mixer.

22. The microchemical nanofactory according to claim 18 where the at least one separator is a dielectrophoretic separator, an electrophoretic separator, a templated, sorbent-based separator, a non-templated separator, a capillary electrochromatographic separator, a capillary zone electrophoretic separator, a membrane separator, or a combination thereof.

23. The microchemical nanofactory according to claim 18 further comprising plural separators.

24. The microchemical nanofactory according to claim 18 further comprising an array of parallel separators.

25. A monolithic microchemical nanofactory, comprising:

at least a first inlet and a second inlet for feeding a first reagent and a second regent to a mixer to form a mixture comprising a product and other materials;

an optional heating or cooling zone for receiving the mixture;

plural microchannels operatively coupled to the mixer for processing fluid flow there through; and plural, selectively and fluidly actuatable valves operatively coupled to the plural microchannels.

26. The microchemical nanofactory according to claim 25 where the first reagent and the second reagent comprise fluids.

27. The microchemical nanofactory according to claim 25 where the mixer is a nozzle mixer.

28. The microchemical nanofactory according to claim 25 where the mixer is an interdigital mixer on a first layer and feeds the mixture to a second layer positioned in a plane parallel to the first layer.

29. The microchemical nanofactory according to claim 25 further comprising a thin film heater.

30. The microchemical nanofactory according to claim 25 where the selectively actuatable valves are fluidly actuatable.

31. The microchemical nanofactory according to claim 30 where at least one valve comprises a fluidly deflectable elastomeric layer.

32. The microchemical nanofactory according to claim 25 where the selectively actuatable valves do not comprise a piston.

33. A monolithic microchemical nanofactory for iterative polymerization, having convergent flow comprising:

a first array of reaction units where each reaction unit receives at least two reagents and outputs a first product stream and other materials;

at least a second array of reaction units for receiving first product streams of the first array where each reaction unit of the second array receives the first product stream from reaction units from the first array, the second array of reaction units forming a second product stream and other materials; and a terminal reactor unit for receiving product streams from an array of reaction units most distal from the first array, the terminal reactor unit outputting a final product stream.

34. The microchemical nanofactory according to claim 33 where the reaction units comprise at least a first fluid inlet and a second fluid inlet for feeding a first fluid and a second fluid to a mixer, thereby forming a product stream comprising a product and other fluids.

35. The microchemical nanofactory according to claim 34 where the mixer is an interdigital mixer.

36. The microchemical nanofactory according to claim 34 where the mixer is a nozzle mixer.

37. The microchemical nanofactory according to claim 34 where at least one reaction unit further comprises at least one separator for separating the product from the other fluids.

38. The microchemical nanofactory according to claim 37 where the at least one separator is a membrane separator.

39. The microchemical nanofactory according to claim 33 where the arrays of reaction units form a fractal geometry resembling a dendritic structure.

40. The microchemical nanofactory according to claim 33 where at least one reaction unit further comprises a temperature control section.

41. The microchemical nanofactory according to claim 40 where the temperature control section is a thin-film heater.

42. The microchemical nanofactory according to claim 33 where at least one reaction unit further comprises at least one valve.

43. The microchemical nanofactory according to claim 42 where the valve is a fluidly actuatable valve.

* * * * *